United States Patent
Takahashi

(10) Patent No.: US 10,714,809 B2
(45) Date of Patent: Jul. 14, 2020

(54) ANTENNA FOR VEHICLE

(71) Applicant: AGC Inc., Tokyo (JP)

(72) Inventor: Kouichirou Takahashi, Tokyo (JP)

(73) Assignee: AGC INC., Tokyo (JP)

( * ) Notice: Subject to any disclaimer, the term of this patent is extended or adjusted under 35 U.S.C. 154(b) by 513 days.

(21) Appl. No.: 15/588,242

(22) Filed: May 5, 2017

(65) Prior Publication Data

US 2017/0331171 A1 Nov. 16, 2017

(30) Foreign Application Priority Data

May 10, 2016 (JP) .................................. 2016-094840
Nov. 10, 2016 (JP) .................................. 2016-220052
Apr. 25, 2017 (JP) .................................. 2017-086458

(51) Int. Cl.
| | |
|---|---|
| *H01Q 1/12* | (2006.01) |
| *H01Q 13/10* | (2006.01) |
| *H01Q 5/378* | (2015.01) |
| *H01Q 9/06* | (2006.01) |
| *B60R 11/00* | (2006.01) |

(52) U.S. Cl.
CPC ........... *H01Q 1/1271* (2013.01); *B60R 11/00* (2013.01); *H01Q 5/378* (2015.01); *H01Q 9/065* (2013.01); *H01Q 13/106* (2013.01)

(58) Field of Classification Search
CPC .......... H01Q 13/08; H01Q 1/22; H01Q 21/06; H01Q 1/1271; H01Q 13/10; H01Q 1/3291; H01Q 1/38; H01Q 13/106; H01Q 11/18; H01Q 9/0414
See application file for complete search history.

(56) References Cited

U.S. PATENT DOCUMENTS

| | | | |
|---|---|---|---|
| 4,746,925 A | 5/1988 | Toriyama | |
| 5,043,738 A | 8/1991 | Shapiro et al. | |
| 5,760,744 A * | 6/1998 | Sauer | B32B 17/10036 29/600 |
| 6,396,446 B1 * | 5/2002 | Walstra | B60C 23/061 343/700 MS |
| 6,486,840 B1 * | 11/2002 | Buren | H01Q 1/1285 343/711 |

(Continued)

FOREIGN PATENT DOCUMENTS

| | | |
|---|---|---|
| GB | 2 355 114 A | 4/2001 |
| JP | S55-028670 A | 2/1980 |

(Continued)

OTHER PUBLICATIONS

Extended European Search Report in corresponding application EP 17170040.4 dated Aug. 31, 2017.

(Continued)

*Primary Examiner* — Ricardo I Magallanes
(74) *Attorney, Agent, or Firm* — Foley & Lardner LLP

(57) ABSTRACT

An antenna for vehicle for receiving electric waves from a vehicle front side is attached to an internal side of a window glass for vehicle. The antenna includes a first radiator having a shape of a plate, at least a part of the first radiator being arranged separated from the window glass for vehicle; and a second radiator arranged separated from the first radiator, and arranged so as to sandwich at least a part of the first radiator between the second radiator and the window glass for vehicle.

16 Claims, 20 Drawing Sheets

(56) References Cited

U.S. PATENT DOCUMENTS

| | | | |
|---|---|---|---|
| 2003/0164800 A1* | 9/2003 | Jordan | H01Q 1/1271 343/713 |
| 2006/0097935 A1* | 5/2006 | Colburn | H01Q 1/1271 343/713 |
| 2006/0109178 A1* | 5/2006 | Takeuchi | H01Q 1/1271 343/700 MS |
| 2007/0279307 A1* | 12/2007 | Ikeda | H01Q 1/1271 343/713 |
| 2008/0103655 A1* | 5/2008 | Turnbull | B60R 1/12 340/425.5 |
| 2012/0218154 A1* | 8/2012 | White | H01Q 1/1271 343/713 |
| 2014/0118179 A1 | 5/2014 | Alland et al. | |
| 2015/0123838 A1* | 5/2015 | Shi | G01S 7/025 342/70 |

FOREIGN PATENT DOCUMENTS

| | | |
|---|---|---|
| JP | H08-148926 A | 6/1996 |
| JP | 2007-053505 A | 3/2007 |
| JP | 4112456 B2 | 7/2008 |
| JP | 2013-201712 A | 10/2013 |
| WO | WO-01/73890 A1 | 10/2001 |

OTHER PUBLICATIONS

Office Action dated Apr. 1, 2020 for corresponding Chinese Patent Application No. 201710322822.5.

\* cited by examiner

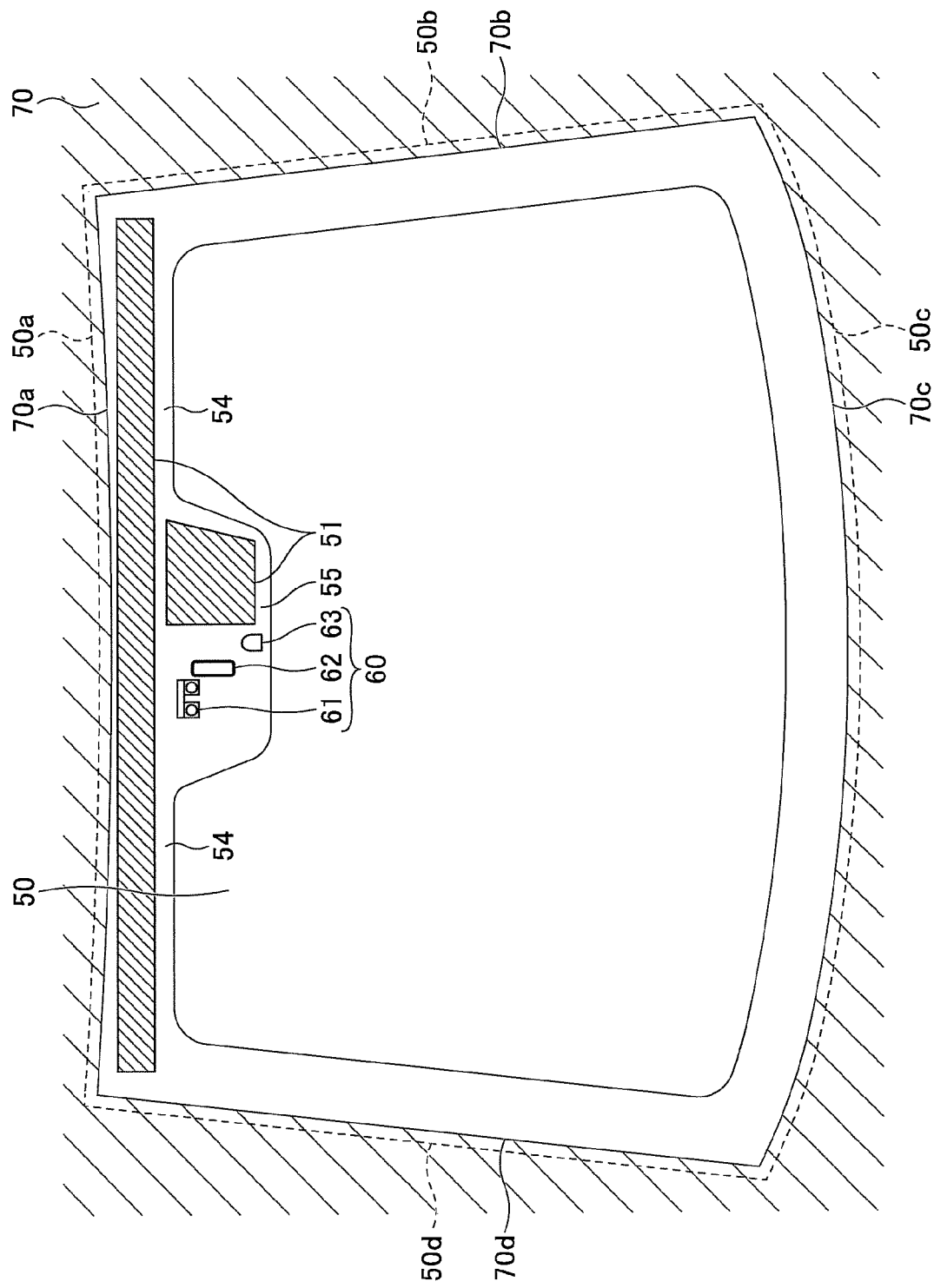

ANTENNA FOR VEHICLE

CROSS-REFERENCE TO RELATED APPLICATIONS

The present application is based on and claims benefit of priority under 35 U.S.C. § 119 of Japanese Patent Applications No. 2016-094840, filed May 10, 2016, No. 2016-220052, filed Nov. 10, 2016, and No. 2017-086458, filed Apr. 25, 2017. The contents of the applications are incorporated herein by reference in their entireties.

BACKGROUND OF THE INVENTION

1. Field of the Invention

The disclosure herein generally relates to an antenna for vehicle that is attached to an internal side of a window glass for vehicle.

2. Description of the Related Art

Conventionally, as antennas for vehicles, antennas for receiving radio broadcasting, glass antennas for receiving television broadcasting, or antennas attached on roofs have been mounted on vehicles. Recently, in ITS (Intelligent Transport Systems), for vehicle-to-vehicle communication or road-to-vehicle communication, electric waves (vertically polarized waves) coming from a vehicle front side or a vehicle rear side are used. In order to perform transmission/reception in the vehicle-to-vehicle communication or the road-to-vehicle communication efficiently, the antennas are required to have high receiving sensitivity for the electric waves from the vehicle front side or the vehicle rear side.

For example, as an antenna for the ITS, Japanese Unexamined Patent Application Publication No. 2007-053505 discloses a configuration of a glass antenna 410 or the like embedded in a front windshield 400, as illustrated in FIG. 1.

Moreover, as a compact antenna for receiving electric waves, an antenna device 600 for a base station of mobile communication, as illustrated in FIG. 2, has been disclosed (See Japanese Patent No. 4112456). In this configuration, a parasitic element 650 is arranged above a grounding conductor 620, in which a slot 630 is provided, a reflection plate 660 is arranged below a feeder line 640, and gain vertically above the antenna of a main polarized wave component is enhanced.

Antennas for vehicles have been disclosed, for example, by Japanese Unexamined Patent Application Publication No. 2007-053505 and Japanese patent No. 4112456.

However, because the glass antenna disclosed in Japanese Unexamined Patent Application Publication No. 2007-053505 or the like is required to be embedded in a window glass for vehicle in advance, the antenna cannot be mounted on an existing vehicle afterwards.

Because the compact antenna device disclosed in Japanese Patent No. 4112456 has been designed on the premise of being used mainly in a base station, a shape of the reflection plate is complicated, and mass production of the antenna has been difficult. Moreover, because the antenna has a configuration premised on being used in the arrangement and the direction, illustrated in FIG. 2, without being inclined, and in an array state in which a plurality of antenna devices are collected, it has not been supposed to be arranged or attached in a state of being inclined. Therefore, when the antenna device 600 is arranged in an inclined state, antenna directivity cannot be controlled, and communication performance may be degraded.

Then, in consideration of the above-described problem, the present invention aims at providing an antenna for vehicle attached to a window glass for vehicle, which has a simple structure, and can transmits/receives electric waves from a front side or a rear side of a vehicle to be communicating.

SUMMARY OF THE INVENTION

It is a general object of at least one embodiment of the present invention to provide an antenna for vehicle that substantially obviates one or more problems caused by the limitations and disadvantages of the related art.

In order to solve the above-described problem, according to an aspect of the present invention, an antenna for vehicle for receiving electric waves from a vehicle front side is attached to an internal side of a window glass for vehicle. The antenna includes a first radiator having a shape of a plate, at least a part of the first radiator being arranged separated from the window glass for vehicle; and a second radiator arranged separated from the first radiator, and arranged so as to sandwich at least a part of the first radiator between the second radiator and the window glass for vehicle.

According to an aspect of the invention, in an antenna for vehicle attached to a window glass for vehicle, a structure is simple, and electric waves from a front side or a rear side of a vehicle to be communicating can be transmitted/received.

BRIEF DESCRIPTION OF THE DRAWINGS

Other objects and further features of embodiments will become apparent from the following detailed description when read in conjunction with the accompanying drawings, in which:

FIG. 7 is a diagram depicting a general arrangement of a window glass for vehicle indicating a position where the antenna for vehicle according to the present invention is arranged;

DETAILED DESCRIPTION OF THE PREFERRED EMBODIMENTS

Figure 1:
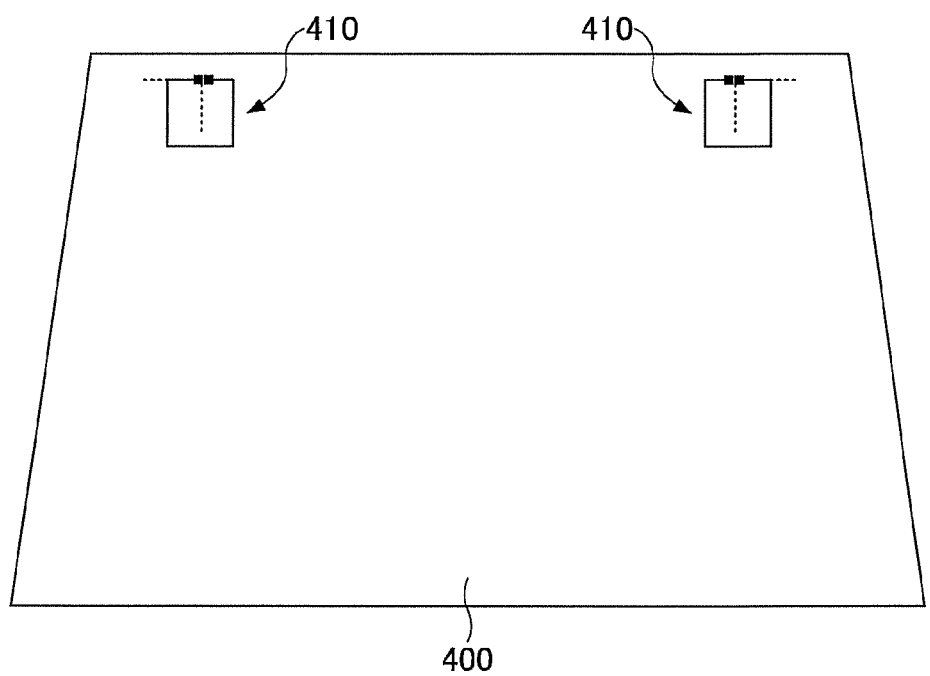
FIG. 1 is a diagram depicting a general arrangement of a window glass in which a glass antenna according to related art 1 is arranged.
Figure 2:
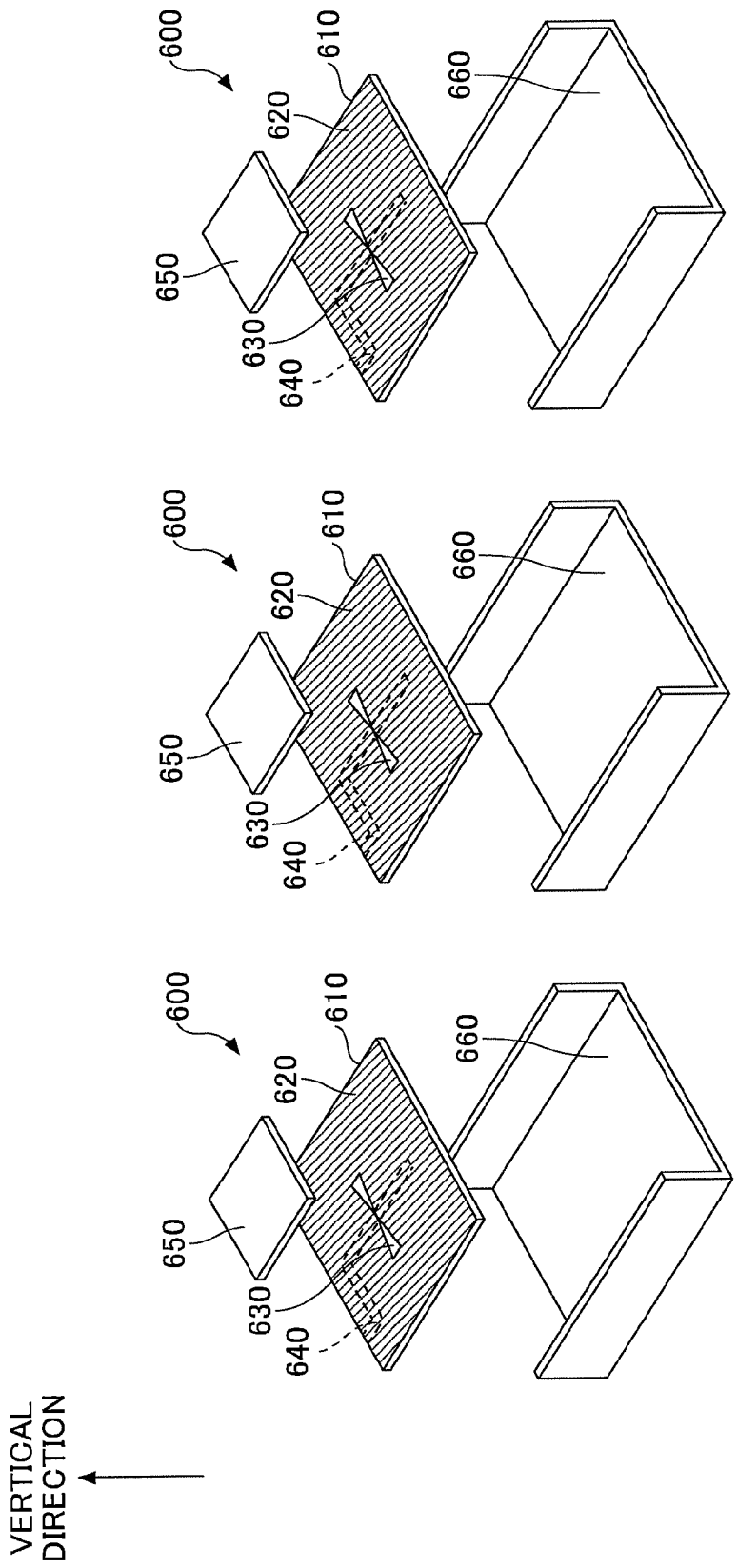
FIG. 2 is an explanatory diagram for a compact antenna according to related art 2 in a case where the compact antenna is assumed to be attached to the window glass for vehicle.

In the following, an embodiment of the present invention will be described with reference to the accompanying drawings. In the drawing for explaining the embodiment, when a direction is not particularly described, the direction on the drawing is assumed to be mentioned, and directions of the respective drawings correspond to directions of symbols or numerals. Moreover, a direction, such as parallel, orthogonal, vertical or the like allows a deviation enough to keep the effect of the present invention. Moreover, in the embodiment in which only reception is described, not only reception but also transmission can be performed.

First Embodiment

Figure 3:
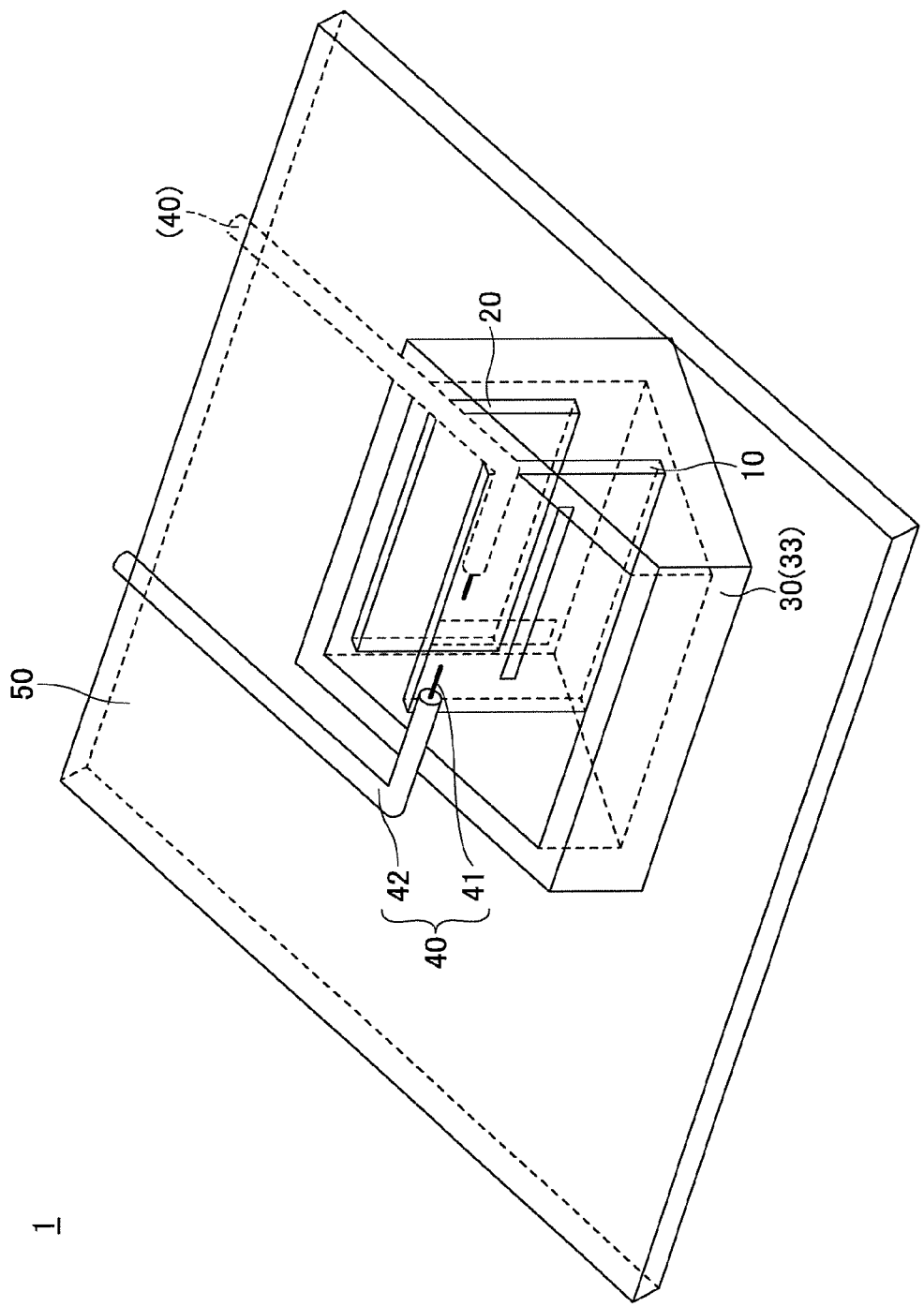
FIG. 3 is a general perspective view depicting an antenna for vehicle according to a first embodiment of the present invention.

FIG. 3 is a general perspective view depicting an antenna for vehicle 1 according to a first embodiment of the present invention. The antenna for vehicle 1 according to the embodiment is attached to an internal side of the window glass for vehicle (front windshield) 50, and a coaxial cable 40 is connected to the antenna for vehicle 1.

In the plurality of embodiments of the present invention, the window glass for vehicle (in the following, may be simply referred to as a window glass) 50, at which the antenna for vehicle 1 is attached, is a dielectric body, and transmits electric waves arriving from outside the vehicle to the antenna for vehicle 1. For example, a thickness of the window glass 50 is assumed to be about 0.5 mm to 10 mm.

The antenna for vehicle 1 is provided with a first radiator 10, a second radiator 20, and a retention unit 30. The first radiator 10 and the second radiator 20 are antenna elements for radiating electric waves.

The first radiator 10 is a main radiator having a feeding structure to which the coaxial cable 40 is connected. The second radiator 20 is a parasitic element that is not fed power. When the second radiator 20 is separated sufficiently from the first radiator 10, e.g. a distance between the radiators is λ/4, the second radiator has a function of a reflector. When the second radiator 20 is close to the first radiator 10, the second radiator 20 has a function of reradiating electric fields forward by coupling with a slot 12 (See FIG. 5A) of the first radiator 10. In the present invention, the function of reradiating according to the close arrangement will be mainly used.

The retention unit 30 is a case that retains the first radiator 10 and the second radiator 20. The retention unit 30 will be described in detail with reference to FIG. 6 later.

Particularly, the first radiator 10 is a radiation plate (first radiation body) having a plate shape. The first radiator 10 is arranged so that at least a part of the first radiator 10 is separated from the window glass 50. Moreover, a distance of closest approach between the window glass 50 and the first radiator 10 is 100 mm or less, preferably 50 mm or less. The distance between the window glass 50 and the first radiator 10 does not affect the antenna characteristic. However, when a projection from a surface of the internal side of the window glass 50 is great in the state where the antenna for vehicle 1 is attached to the window glass 50, a feeling of freedom of a driver may be deteriorated, such as hindrance of the driver's vision or a feeling of pressure for a space inside the vehicle.

Moreover, the second radiator 20 is a second radiation body having a plate shape. The second radiator 20 is arranged on an opposite side of the first radiator 10 to the window glass 50, and separated from the first radiator 10 by a predetermined distance. That is, the second radiator 20 is arranged so as to be separated from the first radiator 10, and sandwich at least a part of the first radiator 10 between the second radiator 20 and the window glass 50.

The coaxial cable 40, as illustrated in FIG. 3, goes outside the frame 33 of the retention unit 30 and feeds power to the front surface and the rear surface of the first radiator 10.

Figure 4:
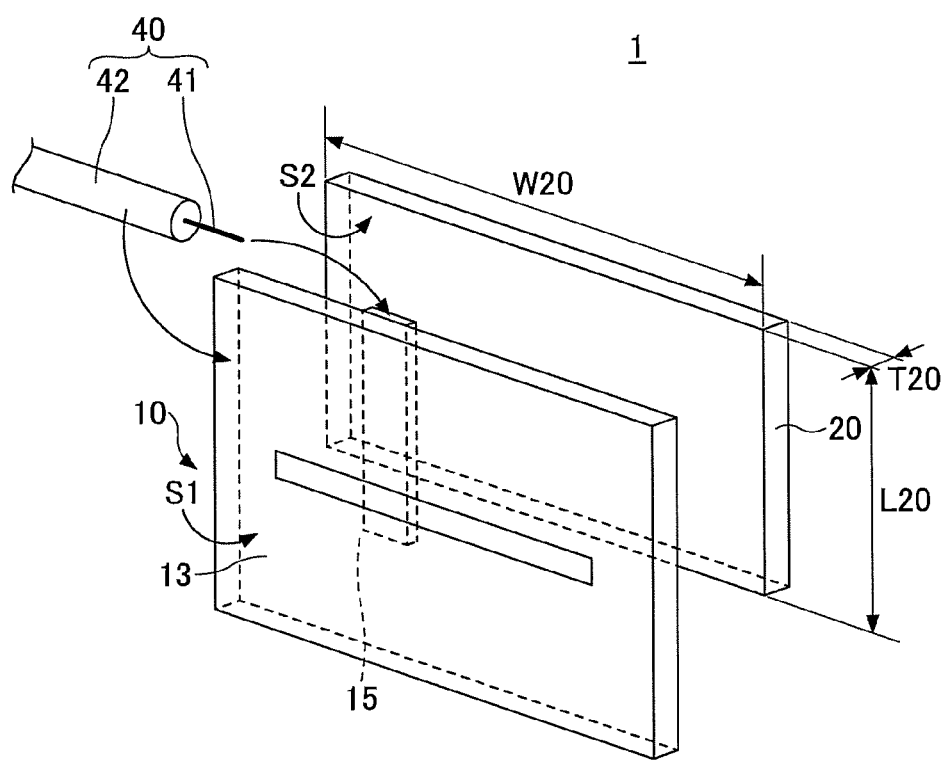
FIG. 4 is an explanatory diagram for a first radiator and a second radiator included in the antenna for vehicle illustrated in FIG. 3, and a coaxial cable connected to the antenna.

FIG. 4 is an explanatory diagram for the first radiator 10, the second radiator 20 and the coaxial cable 40 connected to the first radiator 10, included in the antenna for vehicle 1, illustrated in FIG. 3. The first radiator 10 and the second radiator 20 are arranged contactlessly and separated from each other by a predetermined distance. To the first radiator 10, the coaxial cable 40 is connected, and feeds power.

The coaxial cable 40 is provided with an internal conductor 41 and an external conductor 42. In the coaxial cable 40, the internal conductor 41 is connected to a micro strip line 15 on a rear surface of the first radiator 10, and the external conductor 42 is connected to a ground conductor 13 (See FIG. 4) on a front surface of the first radiator 10.

A signal sent/received at the first radiator 10 can be extracted by the branched internal conductor 41, and the sent/received signal is transmitted to a transmission/reception device (not shown) mounted on the vehicle.

The first radiator 10 and the second radiator 20 have, for example, shapes of rectangular plates. A shape of a main surface, that is a wide surface, is not limited to a perfect rectangle, but corners may be rounded or removed. For example, main surfaces of the second radiator 20 (a front surface S2) preferably have dimensions of 20 mm×20 mm to 100 mm×100 mm.

Figure 5A:
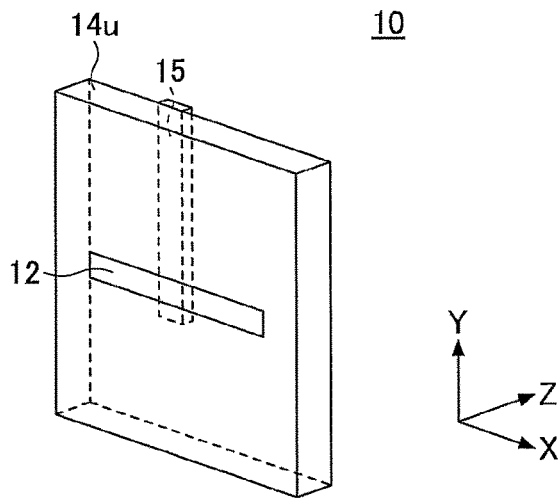
FIGS. 5A and 5B are explanatory diagrams for lamination of the first radiator included in the antenna for vehicle illustrated in FIG. 4.
Figure 5B:
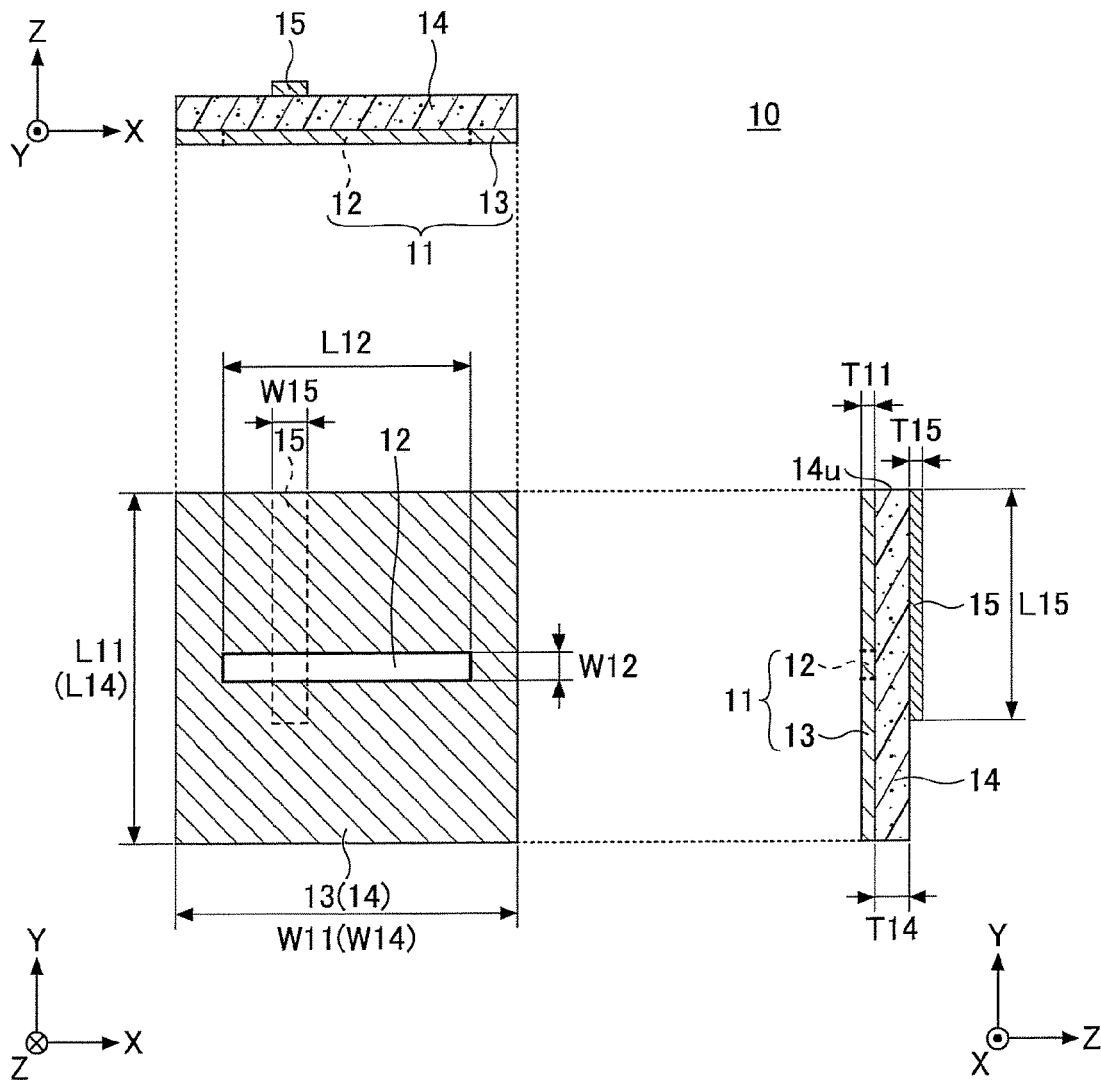

FIGS. 5A and 5B are explanatory diagrams for lamination of the first radiator 10 included in the antenna for vehicle 1 illustrated in FIG. 4. FIG. 5A is a perspective view, and FIG. 5B includes a top view (viewed from +Y side), a front view (viewed from −Z side), and a side view (viewed from +X side). In FIG. 5B, X represents a width direction (W), Y represents a height direction (h), and Z represents a depth direction (d). Specifically, in the embodiment, in a state where the antenna for vehicle 1 is mounted, X in FIG. 5B corresponds to a vehicle width direction approximately parallel to a surface of the internal side of the window glass 50 (front windshield), Y corresponds to an inclination direction θ2 of a surface of the first radiator 10 on the window glass 50 side (vertical direction in the embodiment), and Z corresponds to a direction orthogonal to the inclination direction θ2 (horizontal internal vehicle direction in the embodiment).

With reference to FIGS. 5A and 5B, the first radiator 10 includes a conductive film 11, a dielectric substrate 14, and the micro strip line 15. In other words, the first radiator 10 has a configuration including three layers, i.e. the plate-shaped dielectric substrate 14, a feeding element provided on a main surface (rear surface) of the second radiator 20 side of the dielectric substrate 14 (micro strip line 15), and a radiating element provided on a main surface (front surface S1) of the window glass 50 side of the dielectric substrate 14 (conductive film 11 in which the slot 12 is formed).

The dielectric substrate 14 is made of, for example, a resin (glass epoxy substrate, FR4). It is preferable to use different materials with appropriate electric conductivity for each of the dielectric substrate 14, the conductive film 11, and the micro strip line 15.

In the conductive film 11, the slot 12 is provided. Particularly, the conductive film 11 is cut into strips (slits are notched), and a cut-out part becomes the slot 12. The conductive film 11 in which the slot 12 is formed functions as a radiating element. In the conductive film 11, a part around the slot 12 functions as a ground conductor 13.

The conductive film 11 is formed, for example, of a metallic film (e.g. a silver film formed by calcining a silver paste or the like). The conductive film 11 according to the embodiment of the present invention is not limited to a metallic film, but may be an electrically conductive resin film.

The slot 12 is cut out so as to extend in a first direction when the antenna for vehicle 1 is attached to the window glass 50.

Here, because the electric waves for ITS are vertically polarized waves, the extension direction (first direction) of the slot 12 of the conductive film 11 is provided on the window glass 50 so as to have a vector component of the horizontal direction parallel to the horizon plane (especially, horizontal plane), and thereby electric waves can be received with high sensitivity.

Here, in the present invention, a frequency band of the electric waves for ITS is set from 5.77 GHz to 5.925 GHz, taking account of the frequency bands in the respective regions, such as Japan: 5.77 GHz to 5.85 GHz, North America: 5.85 GHz to 5.925 GHz, and Europe: 5.87 GHz to 5.905 GHz. The central frequency is set to 5.89 GHz. In the frequency band for receiving the electric waves for ITS, a wavelength of the electric waves in the air at the central frequency (5.89 GHz) will be denoted as λ. A wavelength shortening coefficient of the window glass 50 will be denoted as k, and the wavelength of the electric wave in the window glass 50 will be denoted as $\lambda_g$ (=λ·k).

In order to improve the antenna gain, assuming that the velocity of the electric waves is $3.0 \times 10^8$ m/s, and the shortening coefficient k is 0.48, because the slot 12 is formed on the resin substrate, a slot length L12 of the slot 12 is preferably 0.49 $\lambda_g$ to 0.84 $\lambda_g$. Particularly, the slot length L12 of the slot 12 is preferably adjusted to 12.0 mm or more but 20.5 mm or less.

The micro strip line 15 is provided on the rear surface of the first radiator 10 facing the front surface S1, to which the conductive film 11, in which the slot 12 is formed, is bonded. The micro strip line 15 is a band-shaped signal line formed of a conductive film (conductive line (metallic line or electrically conductive resin line)), and functions as a feeding element used for feeding power.

The micro strip line 15 is provided so as to intersect the slot 12. That is, the micro strip line 15 is provided so that when the micro strip line 15 is projected onto the slot 12, a part of the micro strip line 15 overlaps with a part of the slot 12. By overlapping in this way, the slot 12 is excited by the micro strip line 15.

When the part of the micro strip line 15 overlapping with the part of the slot 12 is a part close to one end of the slot 12 and separated from the center, it is preferable in terms of an impedance matching.

Moreover, in the embodiment, the micro strip line 15 extends in a second direction, and reaches an upper edge 14u of the dielectric substrate 14, in the state where the antenna for vehicle 1 is attached to the window glass 50. The second direction corresponds to the inclination angle θ2 of the first radiator 10 with respect to the horizontal plane. In the embodiment, the second direction corresponds to the vertical direction (direction of gravity).

The band-shaped line part that is the micro strip line 15 of the embodiment is electrically connected to the internal conductor 41 of the coaxial cable 40 in the neighborhood where the micro strip line 15 reaches the upper edge 14u of the dielectric substrate 14, and is fed power from the internal conductor 41.

Figure 6:
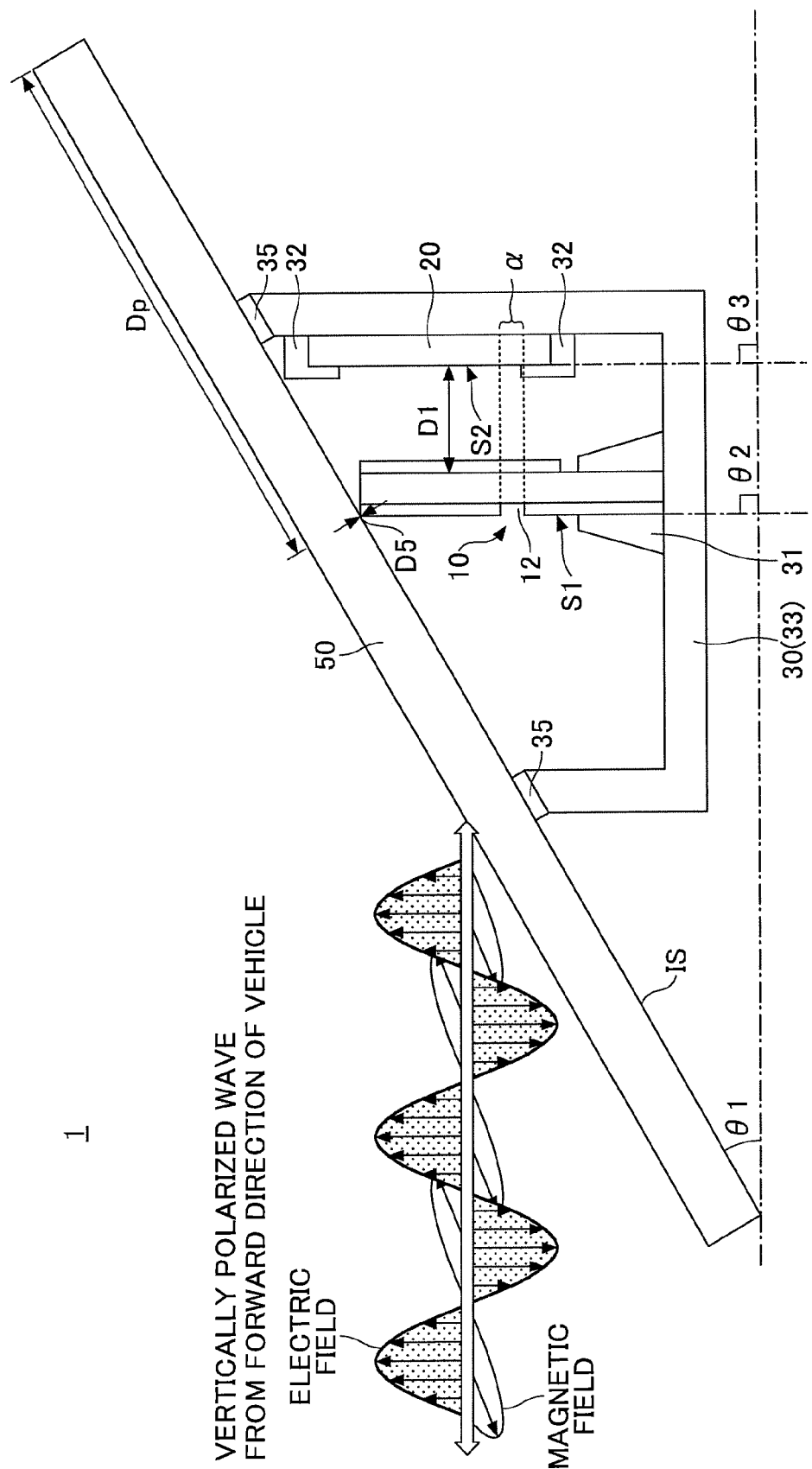
FIG. 6 is a side view depicting the antenna for vehicle according to the first embodiment illustrated in FIG. 3.

FIG. 6 is a side view depicting the antenna for vehicle 1 according to the first embodiment illustrated in FIG. 3.

As illustrated in FIG. 6, in the first embodiment, when the antenna for vehicle 1 is attached to the window glass 50, the first radiator 10 and the second radiator 20 are arranged so that the front surfaces S1, S2 of the first radiator 10 and the second radiator 20 on the window glass 50 side are vertical. That is, the front surfaces S1, S2 of the first radiator 10 and the second radiator 20 on the window glass 50 side are arranged so as to be orthogonal to a propagation direction of an electromagnetic wave incident from the arrival direction of the electric wave.

The retention unit 30 includes, for example, a frame (a frame body, a chassis, or a chassis from which a part of surfaces are removed) 33, a first retention tool 31 provided inside the frame 33 for fixing the first radiator 10, and a second retention tool 32 for fixing the second radiator 20.

In the embodiment, in the side view illustrated in FIG. 6, an outer shape of the frame 33 of the retention unit 30 is a trapezoid having a right angle on one side. A bottom surface extends in the horizontal direction, and surfaces of the frame 33 located on a lower side of slope of the window glass 50 (left side in FIG. 6) and an upper side (right side in FIG. 6) extend in the vertical direction.

As illustrated in FIG. 6, because the retention unit 30 is arranged near the first radiator 10 and the second radiator 20 that are antenna elements, the retention unit 30 is formed of a resin having a low impact on electric waves with a low permittivity (ε≤about 4.0). For example, the retention unit 30 is formed of an acrylic resin, an ABS resin, a vinyl chloride resin, a silicon resin, polycarbonate or the like.

In the embodiment, an example in which the first retention tool 31 for fixing the first radiator 10 and the second retention tool 32 for fixing the second radiator 20 are provided separately is illustrated. However, the retention unit 30 may not be divided into the respective parts, but may be integrated. That is, both the first radiator 10 and the second radiator 20 may be collectively retained by one integrated retention member.

Moreover, a bonding part 35 for bonding the frame 33 to the windows glass 50 is, for example, a suction cup. Therefore, the antenna for vehicle 1 can be attached to and removed from the window glass 50 at an optional position, and a plurality of times.

Generally, in a state where the window glass 50 is mounted on the vehicle, the front surface of the window glass 50 on the internal side (internal surface) IS is inclined at 10° to 90° with respect to the horizontal plane (horizon plane). In this case, the inclination angle of the front surface S1 of the first radiator 10, attached to the window glass 50, on the window glass 50 side is preferably 10° to 90°.

Here, the inclination angle θ1 of the surface IS of the window glass 50 on the internal side and the inclination angle θ2 of the surface S1 of the first radiator 10 on the window glass 50 side may be the same (parallel to each other). Alternatively, the surface IS and the surface S1 may be non-parallel. That is, the surface S1 of the first radiator 10 on the window glass 50 side may be attached with an inclination angle that is different from the inclination angle θ1 of the window glass 50, so that an attachment angle of a predetermined acute angle that is greater than 0° with respect to the window glass 50 is set.

For example, in the embodiment, the surface S1 of the first radiator 10 on the window glass 50 side is set to form an acute angle with the surface IS of the window glass 50 on the internal side and to be in the vertical direction. Furthermore, the surface S2 of the second radiator 20 on the window glass 50 side is set to form an acute angle with the surface IS of the window glass 50 on the internal side and to be in the vertical direction. Therefore, the surface S1 of the first radiator 10 on the window glass 50 side and the surface S2 of the second radiator 20 on the window glass 50 side are arranged parallel to each other.

Specifically, in FIG. 6, with respect to the horizontal plane, the inclination angle of the surface IS of the window glass 50 is θ1=20°, the inclination angle of the surface S1 of the first radiator 10 on the window glass 50 side is θ2=90°, the inclination angle of the surface S2 of the second radiator 20 on the window glass 50 side is θ3=90°. The attachment angle of the surface S1 of the first radiator 10 on the window glass 50 side to the surface IS of the window glass 50 is θ12=70°, and a relative inclination angle of the second radiator 20 from the first radiator 10 is (θ3−θ2)=0°.

However, the surface IS of the window glass 50, the surface S1 of the first radiator 10 on the window glass 50 side, and the surface S2 of the second radiator 20 on the window glass 50 side may be arranged with different inclination angles from each other, as in the fifth embodiment which will be described later (See FIG. 11). Alternatively, the surface IS of the window glass 50, the surface S1 of the first radiator 10 on the window glass 50 side, and the surface S2 of the second radiator 20 on the window glass 50 side may be arranged parallel to each other, as in the fourth embodiment which will be described later (See FIG. 10).

Here, in the present invention, because electric waves (vertically polarized waves) are received/sent from/to the front side or the rear side of the vehicle, it is more preferable from the aspect of the antenna gain, as the inclination angle of the first radiator 10 with respect to the horizontal angle is closer to 90° (vertical). However, as the surface 1S of the first radiator 10 is more parallel to the surface IS of the window glass 50, a projection of the antenna for vehicle 1 from the window glass 50 is smaller, and it is more preferable from the aesthetic aspect. Therefore, the angle is properly set depending on the intended use.

When the first radiator 10 is projected onto the second radiator 20 in the horizontal direction for receiving electric waves from the front side of the vehicle, the second radiator 20 is preferably arranged so as to overlap at least with the slot 12 in the horizontal direction. Particularly, as illustrated in FIG. 6, the second radiator 20 is provided with an overlapping part α with the slot 12 in the horizontal direction. According to the overlapping part α, the second radiator 20 can reradiate electric fields forward by electromagnetic field coupling with the slot 12 in the horizontal direction.

FIG. 7 is a diagram depicting a general arrangement of a window glass for vehicle 50 indicating a position where the antenna for vehicle 1 according to any of the embodiments of the present invention is arranged. FIG. 7 is a diagram depicting a surface of the window glass (front windshield) viewed opposing to the surface. FIG. 7 is a diagram viewed from inside of the vehicle in the state where the window glass is mounted on the vehicle, a left-right direction (transverse direction) in the drawing corresponds to the horizontal direction, and an up-down direction corresponds to the inclination direction of the window glass, and the lower part corresponds to the road surface side. Moreover, because FIG. 7 depicts the window glass that is a front windshield mounted at a front part of the vehicle, the horizontal direction in the drawing corresponds to a vehicle width direction.

Moreover, in the present invention, the window glass 50 is an example of a window plate that covers an opening section of a vehicle chassis. In the window plate, a material is not limited to a glass, and may be a resin, a film or the like. However, the material is required to transmit electric waves. The window glass 50 is attached to a body flange formed on the vehicle chassis (vehicle body opening section, body flange) 70. Outer peripheries 50a, 50b, 50c, 50d of the window glass 50 are illustrated by dashed lines in FIG. 7. The vehicle body chassis 70 includes edge portions 70a, 70b, 70c, and 70d of the body flange that forms a window opening section of the vehicle body.

In FIG. 7, in a periphery region on a surface of the window glass 50 for a front windshield, a shielding film 54 that is black, brown or the like is formed. The antenna for vehicle 1 is attached by arranging the antenna 1 on the shielding film 54. A material of the shielding film 54 includes a ceramics, such as a black ceramics film. The shielding film 54 improves a design property from outside the vehicle and from inside the vehicle when attaching a device for the vehicle, and is required to transmit electric waves.

Recently, in order to improve safety of a vehicle, a twin-lens stereo camera for distance measurement is often mounted on a front window. In the mounted camera, from two images (standard image and reference image) that are obtained by capturing the same object using a plurality of cameras, a shift amount of in image is calculated, and a distance to the object (a person, a car, a signal machine or the like) is determined based on the shift amount in image. Therefore, in order to detect an object in front of the vehicle equally in left and right, a stereo camera 61 tends to be arranged at an upper part around a center of the front windshield in the horizontal direction.

Moreover, a rain sensor 62 for detecting a state of rain is often arranged on the front windshield. The rain sensor is used for automatically controlling a wiper so that a driver is freed from an operation of a wiper switch and visibility in rainy weather is improved.

In order to arrange the stereo camera 61 or the rain sensor 62, the shielding film 54 may be provided with a projecting part (shielding film projecting part) 55 at or near the center of the window glass 50 in the horizontal direction. Both sides of the projecting part 55 are, for example, formed in oblique directions so that a distance between the sides decreases toward the inner region of the window glass 50. At a central portion of the projecting part 55, there is a mirror base 64 for mounting a room mirror.

The projecting part 55 has a width of about one third of the total width of the window glass 50. Specifically, the projecting part 55 has a shape of a trapezoid where a lower edge is shorter than an upper edge. For example, a length of the upper edge is about 260 mm to 660 mm, a length of the lower edge is about 140 mm to 540 mm, and a height of the trapezoid is about 130 mm to 260 mm.

The position of the stereo camera 61 or the rain sensor 62 is an example. When the stereo camera 61 or the rain sensor 62 is integrated with the room mirror, the projecting part 55 of the shielding film may not be provided.

The antenna for vehicle according to the present invention is preferably attached to a part (indicated by reference numeral 51), which is adjacent to a vehicle chassis (metallic body) 70 and in which the shielding film 54 or the projecting part 55 of the shielding film is arranged, in order to facilitate routing of the coaxial cable 40 and improve appearance.

In order to avoid an adverse effect due to interference when the antenna for vehicle 1 is too close to the metallic vehicle chassis 70, a distance of closest approach between the antenna for vehicle 1 and the upper edge 70a or the side edges 70b, 70c of the opening section of the vehicle chassis 70 is preferably 30 mm, for example. Furthermore, the antenna for vehicle 1 is preferably arranged in the range of the shielding films 54, 55.

On the window glass of the vehicle, a conductive film (metallic film) may be formed in order to reduce infrared light (heat by direct solar radiation), reduce ultraviolet light (sunburn), add a defrosting function, or the like. In this way, when a transparent conductive film is bonded to the window glass, electric waves are attenuated by the transparent conductive film, and an antenna that is attached afterwards may not function.

Therefore, when the transparent conductive film is bonded to the window glass, preferably the transparent conductive film is partially cut out at a specialized facility or the like, a film cutout part for transmitting electric waves is provided on the window glass, and the antenna for vehicle according to the present invention is bonded.

Second Embodiment

Figure 8A:
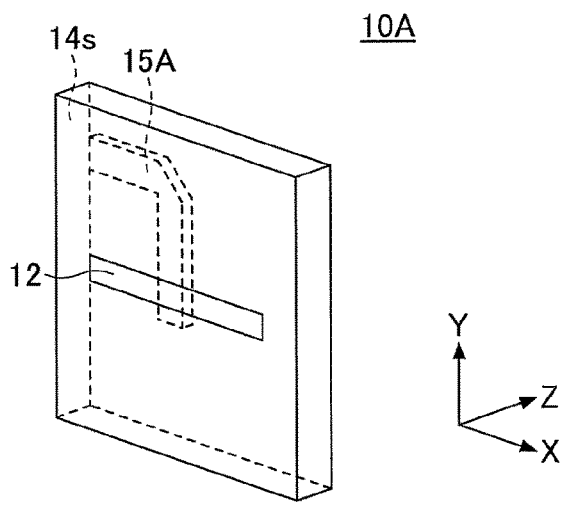
FIGS. 8A and 8B are explanatory diagrams for lamination of a first radiator according to a second embodiment of the present invention.
Figure 8B:
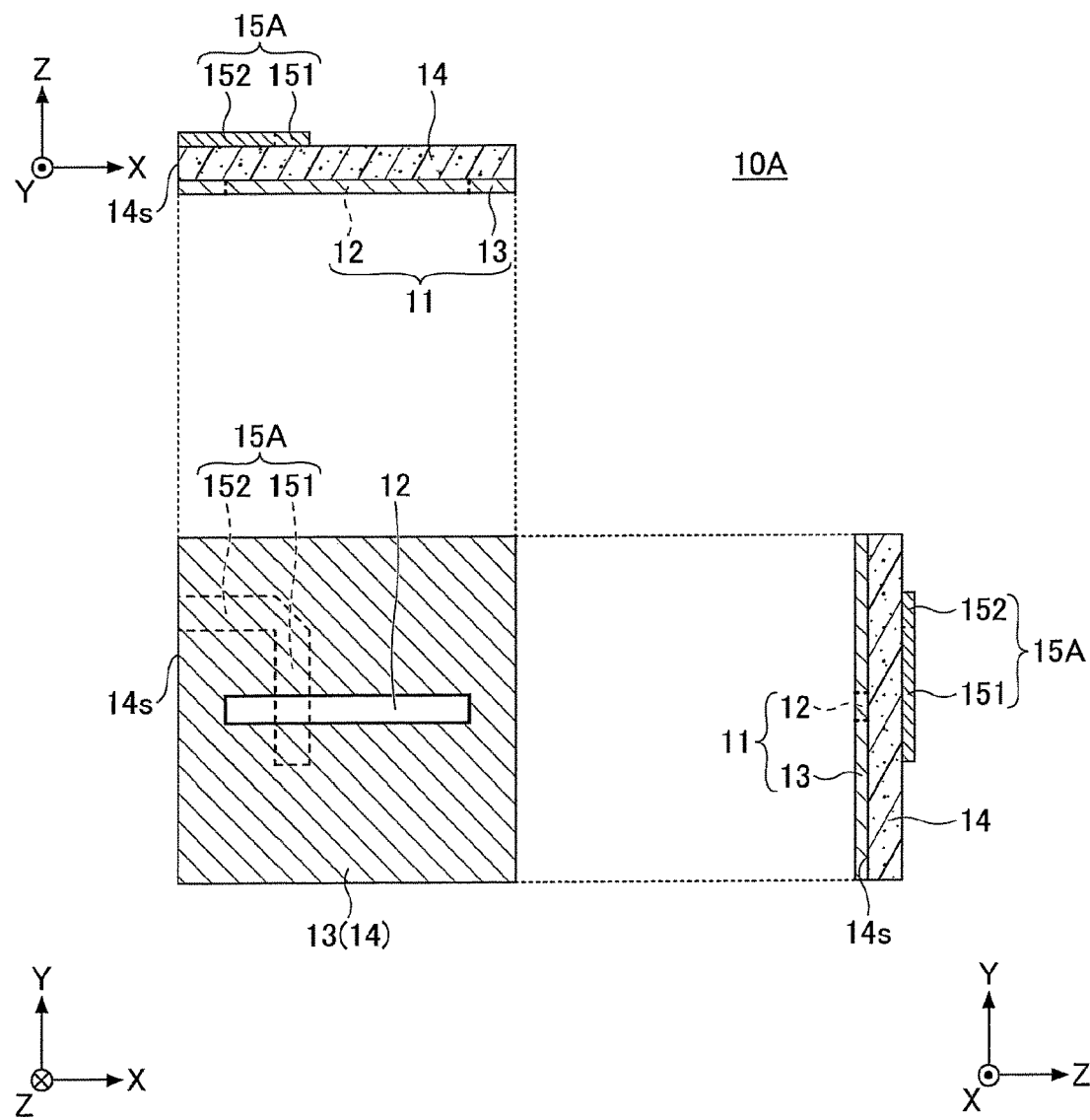

FIGS. 8A and 8B are explanatory diagrams for lamination of a first radiator 10A of an antenna for vehicle according to a second embodiment of the present invention. FIG. 8A is a perspective view, and FIG. 8B includes a top view (viewed from +Y side), a front view (viewed from −Z side), and a side view (viewed from +X side). In FIG. 8B, X represents a width direction (W), Y represents a height direction (h), and Z represents a depth direction (d). Specifically, in the embodiment, in a state where the antenna for vehicle is mounted, X in FIG. 8B corresponds to a vehicle width direction approximately parallel to the surface IS of the internal side of the window glass 50, Y corresponds to an inclination direction θ2 of a surface S1 of the first radiator 10A on the window glass 50 side (vertical direction in the embodiment), and Z corresponds to a direction orthogonal to the inclination direction θ2).

In the embodiment, a shape of the micro strip line 15A in the first radiator 10A is different from the shape in the first embodiment. In the embodiment, the micro strip line 15A formed on a rear surface of the dielectric substrate 14 includes a first line part 151 that overlaps with an end portion of the slot 12, and a second line part 152 that extends from the first line part 151 via a bending portion.

The first line part 151 overlaps with a part of the slot 12 that is close to one end of the slot 12 and separated from the center, and extends in a second direction that is different from the horizontal direction. The second direction corresponds to the inclination angle θ2 of the first radiator 10A with respect to the horizontal plane.

The second line part 152 is formed by bending an upper end of the first line part 151 and extends in a third direction that is different from the second direction. Moreover, in the state where the antenna for vehicle is attached to the window glass 50, the second line part 151 reaches a side edge 14s of the dielectric substrate 14. In the example illustrated in FIGS. 8A and 8B, the third direction is the horizontal direction, but the third direction may be another direction as long as being different from the second direction.

In the embodiment, the micro strip line 15A is electrically connected to the internal conductor 41 (See FIG. 3) of the coaxial cable 40 at the upper end of the second line part 151 in the neighborhood where the micro strip line 15A reaches the side edge 14s of the dielectric substrate 14, and is fed power from the internal conductor 41.

In the first and second embodiments, the micro strip lines 15, 15A have forms of band-shaped lines. However, an end portion of the micro strip line 15 that is not connected to the internal conductor 41 may be another shape. For example, the end portion may spread like a fan or in an approximately circular shape.

Third Embodiment

Figure 9:
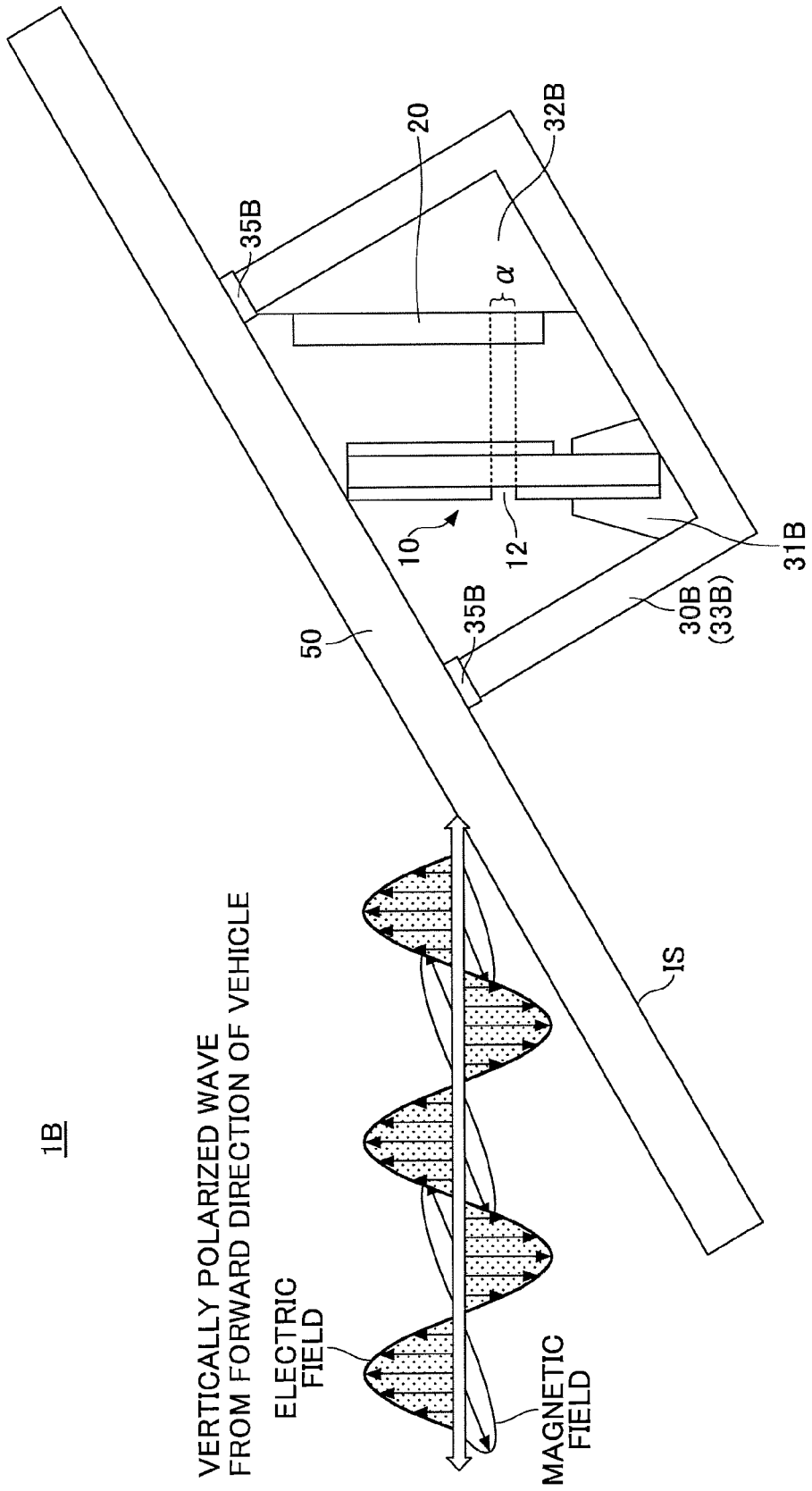
FIG. 9 is a side view depicting an antenna for vehicle according to a third embodiment of the present invention.

FIG. 9 is a side view depicting an antenna for vehicle 1B according to a third embodiment of the present invention. In the embodiment, a shape and an arrangement of the antenna elements are the same as those in the first embodiment. However, a shape of a retention unit 30B is different from that in the first embodiment.

In the first embodiment illustrated in FIG. 6, in the side view, the outer shape of the frame 33 of the retention unit 30 is a trapezoid having a right angle on one side. An outer shape of the frame 33B of the retention unit 30B according to the embodiment illustrated in FIG. 9 is a rectangle in the side view. In the retention unit 30B, a bottom surface extends in a direction parallel to the surface IS of the window glass 50, and surfaces of the frame 33B located on a lower side of slope of the window glass 50 (left side in FIG. 9) and an upper side (right side in FIG. 9) extend in a direction orthogonal to the inclination direction of the surface IS of the window glass 50.

Regarding the shape of the frame body of the retention unit in the side view, the shape of a trapezoid having a right angle on one side in the first embodiment, and the shape of a rectangle in the third embodiment were explained. However, the shape of the retention unit in the side view is not limited to them. For example, the frame body may have a variety of shapes depending on sizes and arrangements of the first radiator and the second radiator, such as a parallelogram in which a bottom surface extends in a direction parallel to the window glass 50 and surfaces located on the upper and lower sides of slope of the window glass for vehicle extend vertically, a trapezoid that does not have a right angle, or the like.

Fourth Embodiment

Figure 10:
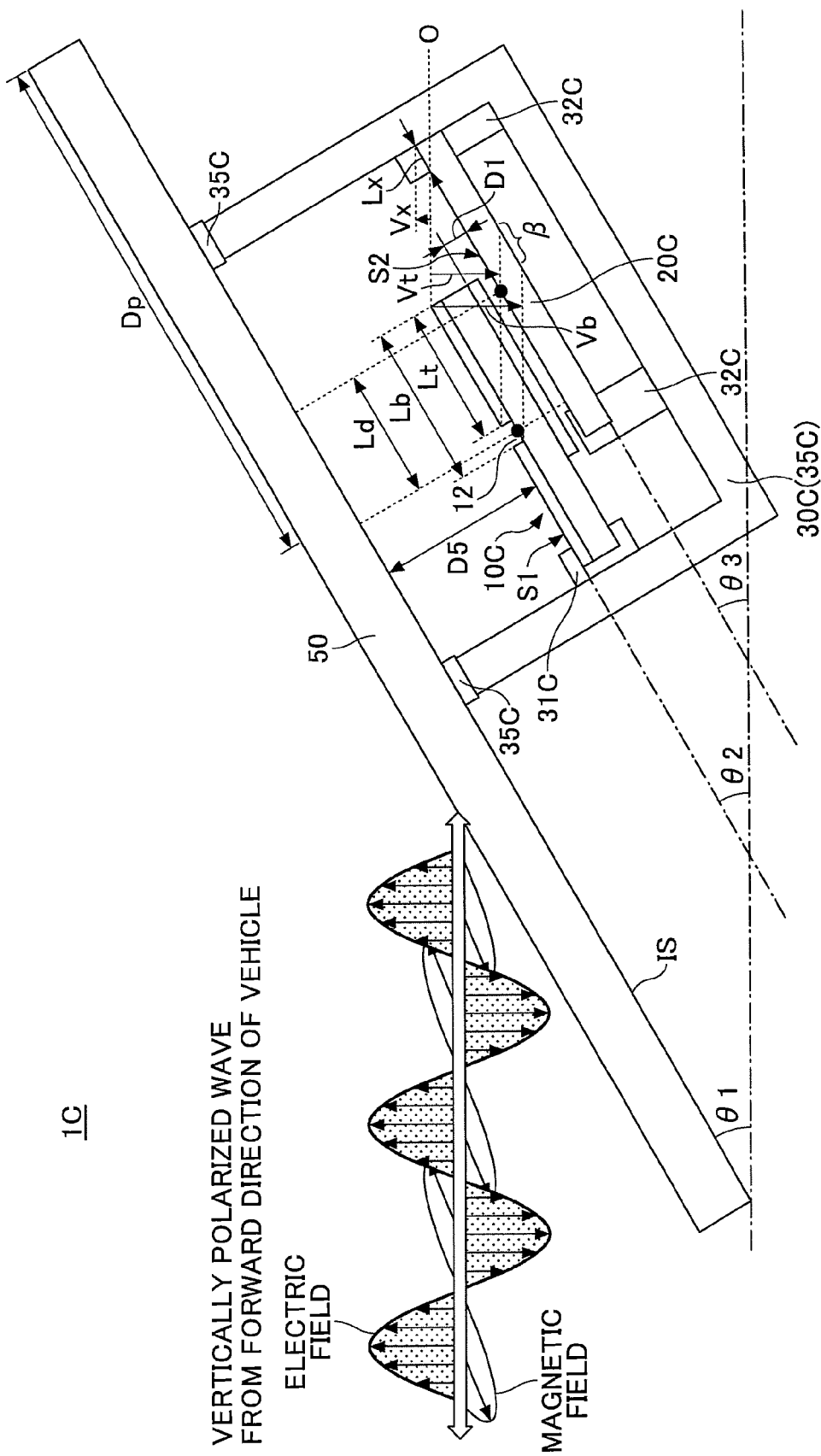
FIG. 10 is a side view depicting an antenna for vehicle according to a fourth embodiment of the present invention.

FIG. 10 is a side view depicting an antenna for vehicle according to a fourth embodiment of the present invention. In the embodiment, a mechanism of a shape of a fixture tool is the same as in the third embodiment. However, an angle of the antenna element is different from that in the first and third embodiments.

In the embodiment, a surface IS of the window glass 50, a surface S1 of a first radiator 10C on the window glass 50 side, and a surface S2 of a second radiator 20C on the window glass 50 side are inclined with respect to the horizontal plane, so that the surfaces IS, S1, S2 are parallel to each other.

Also in the embodiment, when the first radiator 10C is projected onto the second radiator 20C in the horizontal direction for receiving electric wave from the front side of the vehicle, the second radiator 20C is preferably arranged so as to overlap at least with the slot 12 in the horizontal direction. Particularly, as illustrated in FIG. 10, the second radiator 20C is provided with an overlapping part β with the slot 12 in the horizontal direction. According to the overlapping part β, the second radiator 20C can reradiate electric fields forward by electromagnetic field coupling with the slot 12 in the horizontal direction.

Fifth Embodiment

Figure 11:
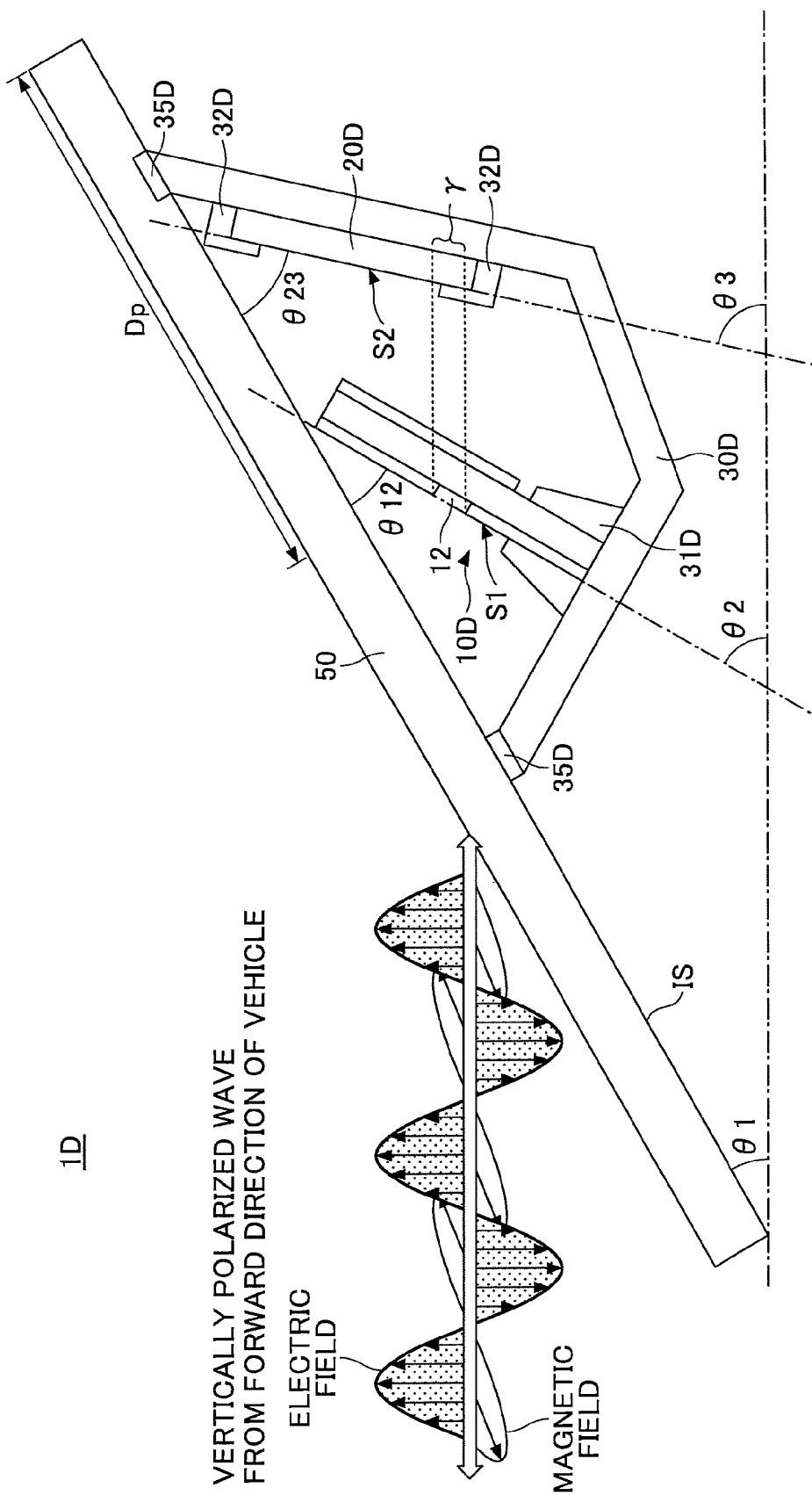
FIG. 11 is a side view depicting an antenna for vehicle according to a fifth embodiment of the present invention.

FIG. 11 is a side view depicting an antenna for vehicle 1D according to a fifth embodiment of the present invention. In the first to fourth embodiments, in the side view, examples in which the first radiator 10 and the second radiator 20 are parallel to each other were described.

However, in the embodiment, an inclination direction θ1 a surface IS of a window glass 50, an inclination direction θ2 a surface S1 of a first radiator 10D on a window glass 50 side, and an inclination direction θ3 a surface S2 of a second radiator 20D on a window glass 50 side are inclined at different angles.

Also in the embodiment, when the first radiator 10D is projected onto the second radiator 20D in the horizontal direction for receiving electric waves from the front side of the vehicle, the second radiator 20D is preferably arranged so as to overlap at least with the slot 12 in the horizontal direction. For example, as illustrated in FIG. 11, the second radiator 20D is provided with an overlapping part γ with the slot 12 in the horizontal direction. According to the overlapping part γ, the second radiator 20D can reradiate electric fields forward by electromagnetic field coupling with the slot 12 in the horizontal direction.

Sixth Embodiment

Figure 12:
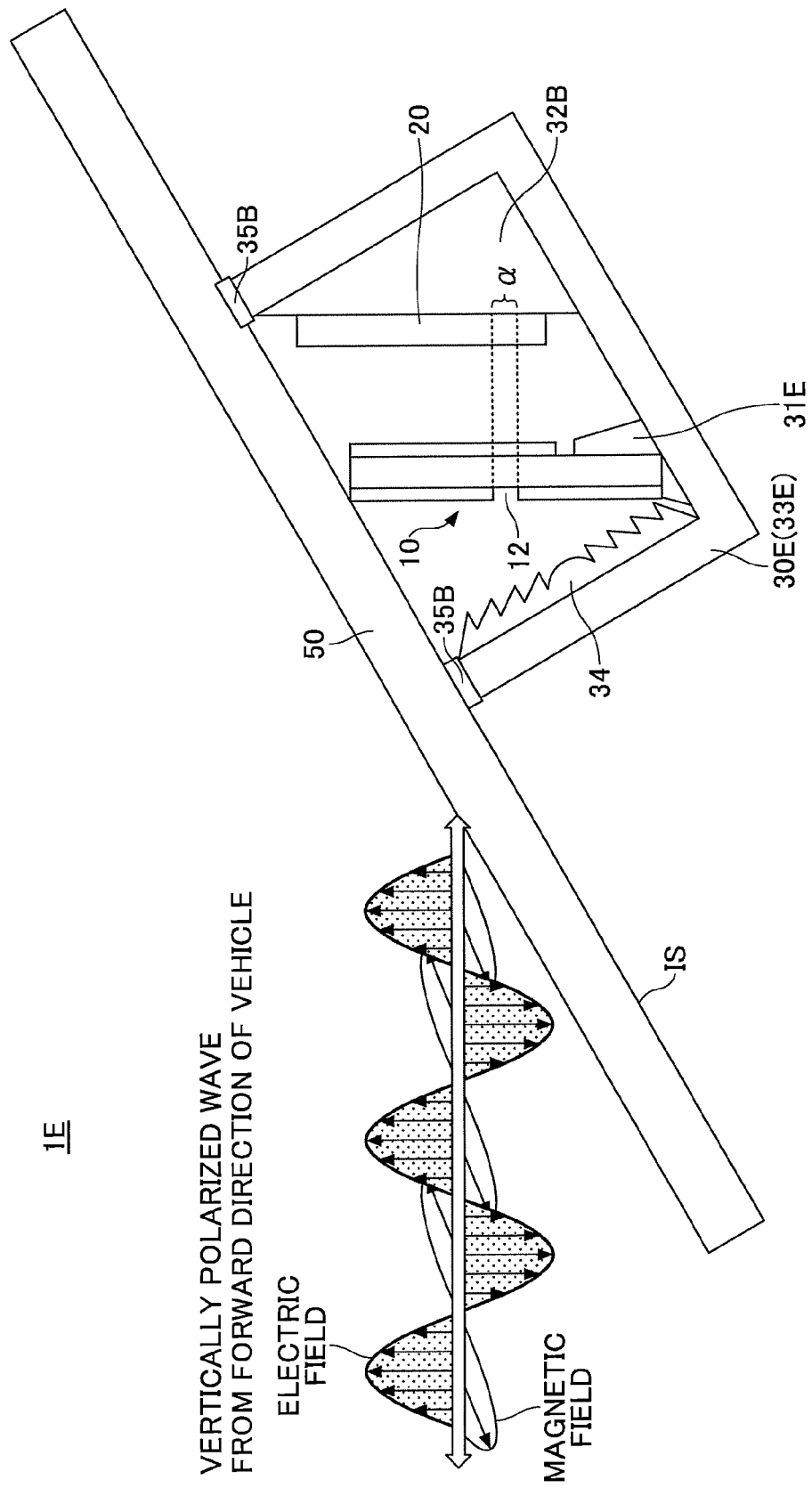
FIG. 12 is a side view depicting an antenna for vehicle according to a sixth embodiment of the present invention.

FIG. 12 is a side view depicting an antenna for vehicle 1E according to a sixth embodiment of the present invention. In the embodiment, a retention unit 30E includes a frame 33E for surrounding a first radiator 10 and a second radiator 20, and is provided with a lens for adjustment 34 on at least a part of a surface of the frame 33E located on a lower side of slope of a window glass 50 (left side in FIG. 12).

A material of the lens for adjustment 34 is the same material as the retention unit 30E. The lens for adjustment 34 is formed by processing the surface. For example, the lens for adjustment 34 is a Fresnel lens.

The lens for adjustment 34 controls a propagation direction of electromagnetic waves propagated from the first radiator 10 and the second radiator 20, and converting a wave front from a spherical wave front to a plane wave front. Therefore, according to the lens for adjustment 34, a forward gain can be improved.

In the third to sixth embodiments, explanation has been performed by using the structure of the first radiator 10 according to the first embodiment. However, the first radiator 10A provided with the micro strip line 15A according to the second embodiment may be applied to the variations of the retention unit or the configuration, in which the inclination angles of the first and second radiators are changed, according to the third to sixth embodiments.

Seventh Embodiment

Figure 13:
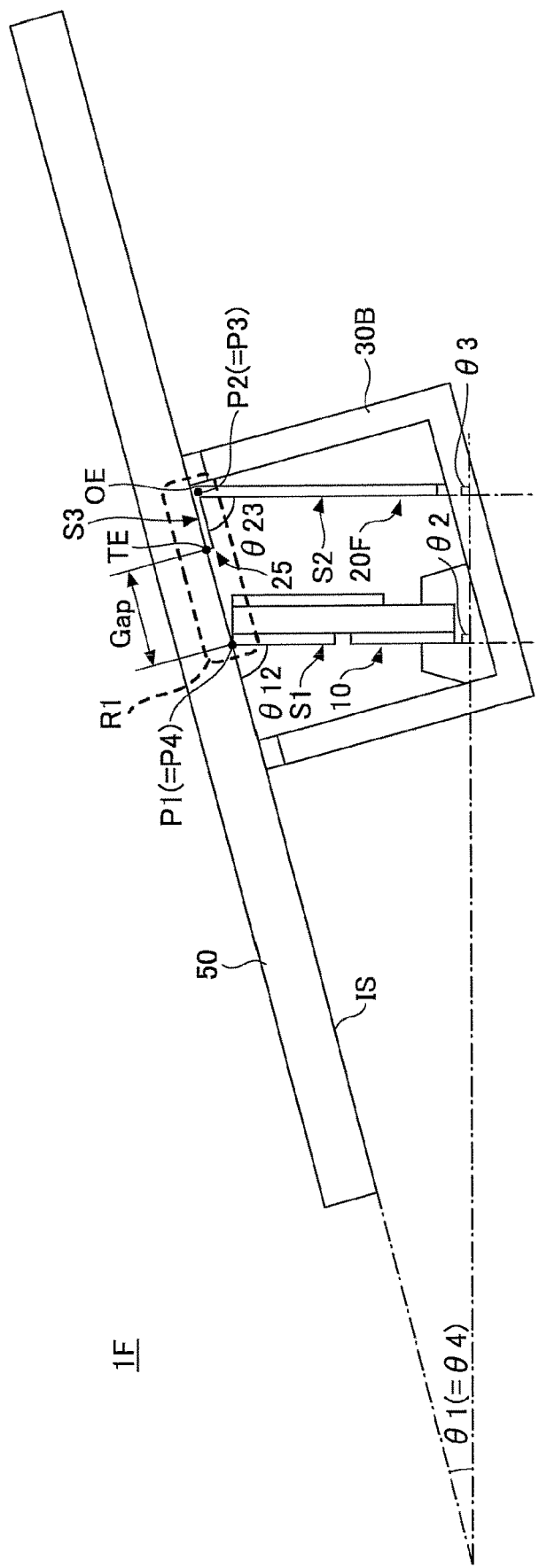
FIG. 13 is a side view depicting an antenna for vehicle according to a seventh embodiment of the present invention.

FIG. 13 is a side view depicting an antenna for vehicle 1F according to a seventh embodiment of the present invention. Compared with the antenna for vehicle 1B according to the second embodiment illustrated in FIG. 9, the antenna for vehicle 1F is provided with a third radiator 25.

As illustrated in FIG. 13, in the embodiment, the third radiator 25, which is a plate-shaped radiator, is arranged in a region R1 between an upper end P1 of a first radiator 10 and an upper end P2 of a second radiator 20F.

Moreover, in the embodiment, one end OE of the third radiator 25 is connected to the upper end P2 of the second radiator 20F, and the third radiator 25 is integrated with the second radiator 20F. A surface S3 of the third radiator 25 extends in a different direction from that of a surface S2 of the second radiator 20F so that the other end TE of the third radiator 25 approaches a contact point P4 of the upper end of the first radiator 10 with the window glass for vehicle 50, that is the upper end P1 of the first radiator 10 (P1=P4). That is, the third radiator 25 is bent from the second radiator 20F, and is integrated with the second radiator 20F.

Moreover, in the embodiment, the third radiator 25 is arranged so that an entire region of one surface (surface S3) of the third radiator 25 contacts the surface IS of the window glass for vehicle 50 on the internal side.

The third radiator 25 is arranged so as not to contact the first radiator 10. On this occasion, an interval (distance) "gap" between the other end TE of the third radiator 25 and the upper end P1 of the first radiator 10 is preferably 0.046 λg or more. The interval "gap" will be described in detail in Example 4.

Figure 14:
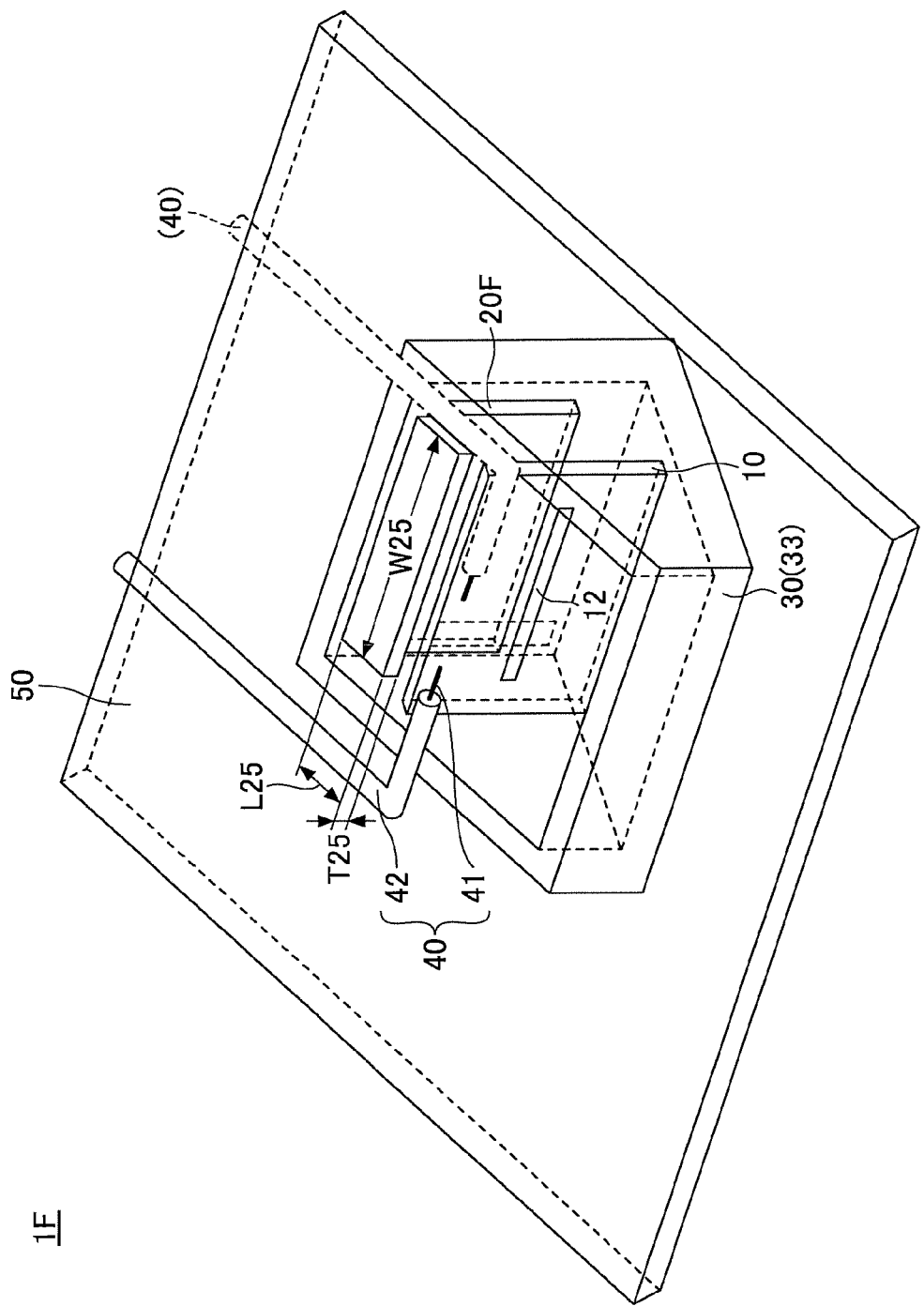
FIG. 14 is an explanatory diagram for a first radiator, a second radiator, and a third radiator included in the antenna for vehicle illustrated in FIG. 13, and a coaxial cable connected to the antenna.

FIG. 14 is an explanatory diagram for the first radiator 10, the second radiator 20F, and the third radiator 25 included in the antenna for vehicle 1F illustrated in FIG. 13, and a coaxial cable 40 connected to the antenna.

A shape of a retention unit for retaining the radiators 10, 20F, and 25 of the antenna for vehicle 1F according to the embodiment may be any of the shapes in the first to sixth embodiments. For example, FIG. 13 illustrates an example in which the shape of the retention unit is the same as the shape of the retention unit 30B illustrated in FIG. 9. FIG. 14 illustrates an example in which the shape of the retention unit is the same as the shape of the retention unit 30 illustrated in FIG. 6.

As illustrated in FIG. 14, the third radiator 25 is formed so that a width W25 of the third radiator 25 is almost the same as the width W20 of the second radiator 20F (See FIG. 4).

The third radiator 25 is a parasitic element that is not fed power. The third radiator 25 has a function of reradiating forward, according to the close arrangement, electric fields by a coupling with the slot 12 of the first radiator 10, especially electric fields emitted toward the outside of the window glass for vehicle 50 and in the direction approximately orthogonal to the window glass for vehicle 50.

Therefore, when the width W25 of the third radiator 25 is set to the same width as the second radiator 20F, as illustrated in FIG. 14, the electric wave reradiated forward by the second radiator 20F can be prevented from leaking, along the width direction, in the direction orthogonal to the window glass for vehicle 50.

Eighth Embodiment

Figure 15:
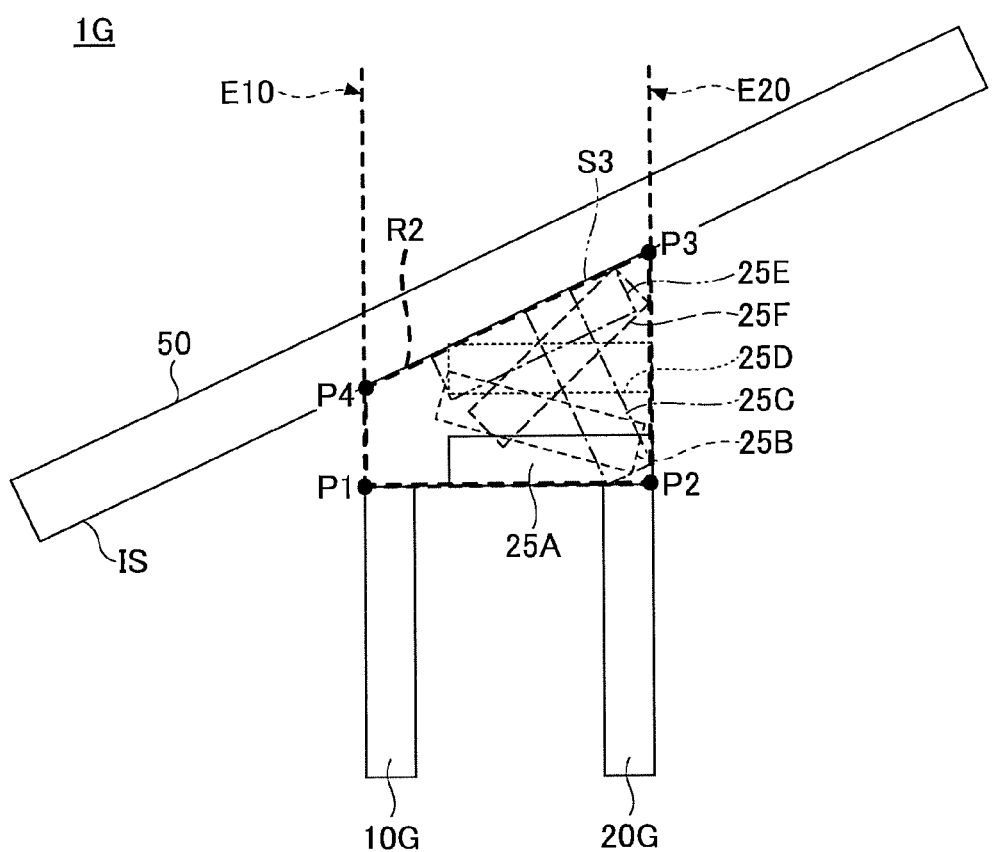
FIG. 15 is a side view depicting an antenna for vehicle according to an eighth embodiment of the present invention.

FIG. 15 is a side view depicting an antenna for vehicle 1G according to an eighth embodiment of the present invention. In FIG. 15, a retention unit 30 is omitted for the purpose of illustration.

FIG. 15 depicts an example of the antenna for vehicle 1G, in which a first radiator 10G and a second radiator 20G are separated from a surface IS of the window glass for vehicle 50 on the internal side.

As illustrated by solid lines in FIG. 15, a third radiator 25A according to the embodiment is connected to an upper end P2 of the second radiator 20G, and extends toward an upper end P1 of the first radiator 10G. An angle and an arrangement of the third radiator 25A are not limited to the example illustrated by the solid lines in FIG. 15.

Particularly, the third radiator 25 may be at any position, as long as the third radiator is arranged within a quadrangle region R2 formed by the upper end P1 of the first radiator 10G, the upper end P2 of the second radiator 20G, a contact point P3 of an extension line E20 of the second radiator 20G in the vertical direction with the window glass for vehicle 50, and a contact point P4 of an extension line E10 of the first radiator 10G in the vertical direction with the window glass for vehicle 50.

For example, when one end OE of the third radiator (25A, 25B, or 25C) is connected to the upper end P2 of the second radiator 20G, another end TE of the third radiator 25 is extended so that the third radiator 25 fits within a frame of a quadrangle (trapezoid) defined by P1, P2, P3 and P4.

For example, in FIG. 15, the third radiator 25B extends to the contact point P3 of the extension line E20 of the second radiator 20G in the vertical direction with the window glass for vehicle 50. Moreover, the third radiator 25C extends toward the surface IS of the window glass for vehicle 50 on the internal side.

Furthermore, although the third radiator 25 is integrated with the second radiator 20G, the third radiator 25A may be separated from the second radiator 20G. When the third radiator 25A and the second radiator 20G are separated from each other, the third radiator 25 is arranged so as to fit within the frame of a region R2 of a quadrangle (trapezoid) defined by P1, P2, P3 and P4.

For example, in FIG. 15, the third radiator 25D is arranged approximately in parallel to the third radiator 25A that is connected to the upper end P2 of the second radiator 20G, and above the third radiator 25A. Moreover, the third radiator 25E is arranged so that a surface S3 of the third radiator 25E contacts the surface IS of the window glass for vehicle 50 on the internal side. Alternatively, the third radiator 25F is arranged so as to extend from a neighborhood of the contact point P3 of the extension line E20 of the second radiator 20G in the vertical direction with the window glass for vehicle 50 toward the upper end P1 of the first radiator 10G.

In either case, because the third radiators 25A to 25F fit within the region R2 of the quadrangle (trapezoid) defined by P1, P2, P3 and P4, and the third radiators extend in different angles from the second radiator, leakage of electric waves can be prevented and can be inhibited.

The third radiator 25A may be arranged at any position inside the region R2. However, in any configuration, the third radiator 25A is assumed to be separated from the first radiator 10G. In this case, intervals (distances) gap between another ends TE of the third radiators 25A to 25F and the upper end P1 of the first radiator 10G are preferably 0.025 $\lambda g$ or more.

Moreover, in this case, at least a part of the outer surface of the third radiator preferably contacts the surface IS of the window glass for vehicle 50 on the internal side, as the third radiator 25C or 25d, for example.

By being arranged in this way, the third radiator, according to the coupling to the slot 12 of the first radiator 10G, is provided with a function of reradiating forward the electric fields emitted toward the outside of the window glass for vehicle 50, and can prevent electric waves from leaking in the direction orthogonal to the window glass for vehicle 50.

In FIG. 15, an example where the position of the first end P1 of the first radiator 10G and the position of the second end P2 of the second radiator 20G are the same (heights are the same) is illustrated. In the case where the heights of P1 and P2 are different from each other, the region R2 defined by P1, P2, P3 and P4 is not a vertical trapezoid, as illustrated in FIG. 15. The region R2 may be another quadrangle, such as a trapezoid or a parallelogram.

Ninth Embodiment

Figure 16:
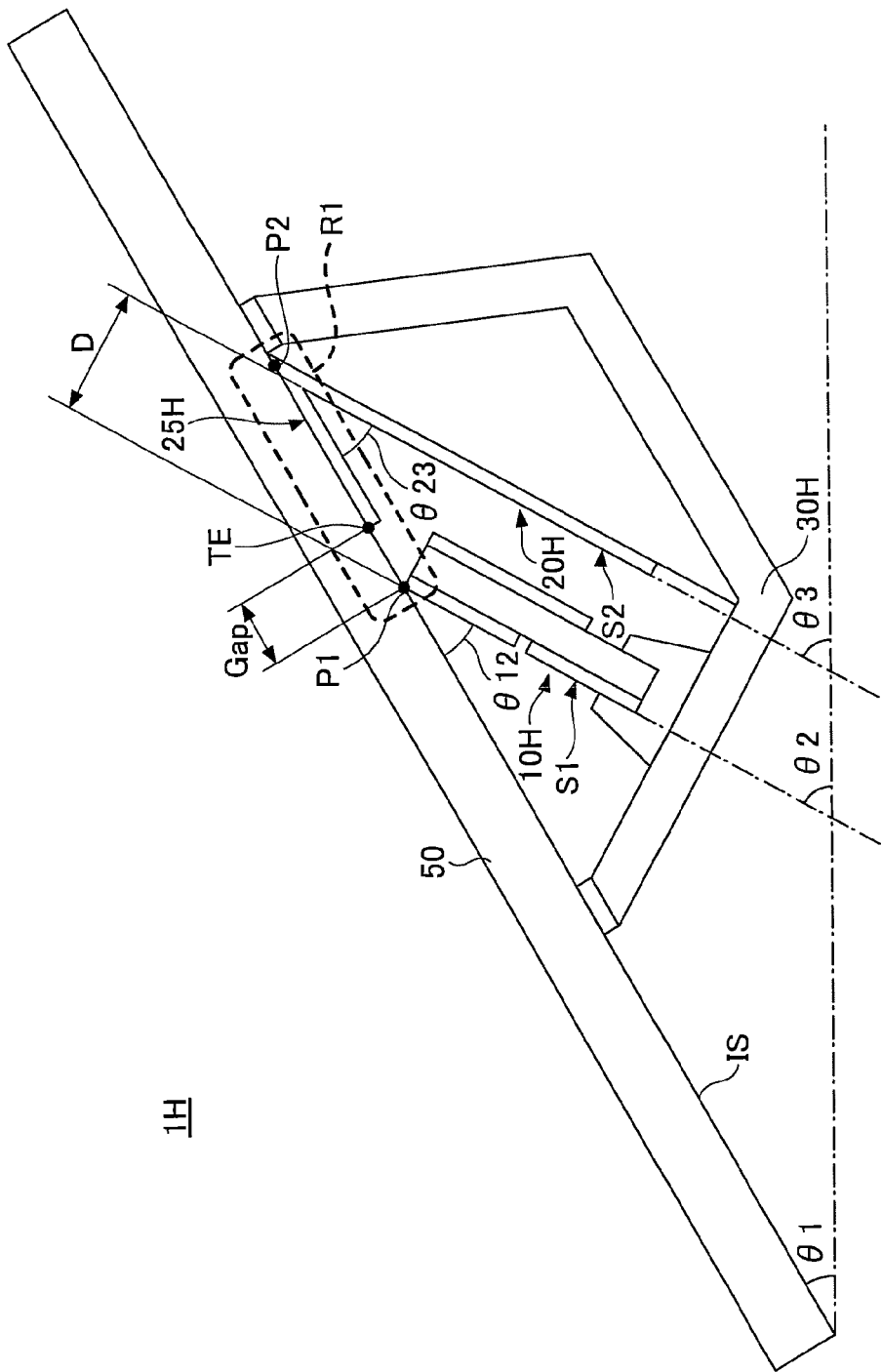
FIG. 16 is a side view depicting an antenna for vehicle according to a ninth embodiment of the present invention.

FIG. 16 illustrates a side view depicting an antenna for vehicle 1H according to a ninth embodiment of the present invention. Compared with the antenna for vehicle 1F according to the seventh embodiment, illustrated in FIG. 13, inclination angles θ2, θ3 of a first radiator 10H and a second radiator 20H of the antenna for vehicle 1H are different from those of the antenna of vehicle 1F.

Also in the embodiment, a third radiator 25H is arranged within a region R1 between an upper end P1 of the first radiator 10H and an upper end P2 of the second radiator 20H.

Moreover, also in the example illustrated in FIG. 16, in the same way as the antenna for vehicle 1F illustrated in FIG. 13, the plate-shaped third radiator 25H is bent from the plate-shaped second radiator 20H, and is integrated with the second radiator 20H.

Also in the configuration, the third radiator 25H is assumed to be separated from the first radiator 10H. In this case, an interval (shortest distance) gap between another end TE of the third radiator 25H and the upper end P1 of the first radiator 10H is preferably $0.015\lambda_g$ or more. The interval will be described in detail in Example 4.

In the seventh to ninth embodiments, the structure of the first radiator 10 according to the first embodiment is used for explanation. However, the first radiator 10A provided with the micro strip line 15A according to the second embodiment may be applied to the addition of the third radiator 25 or the change in setting of the inclination angles of the first radiator and the second radiator.

Tenth Embodiment

Figure 17:
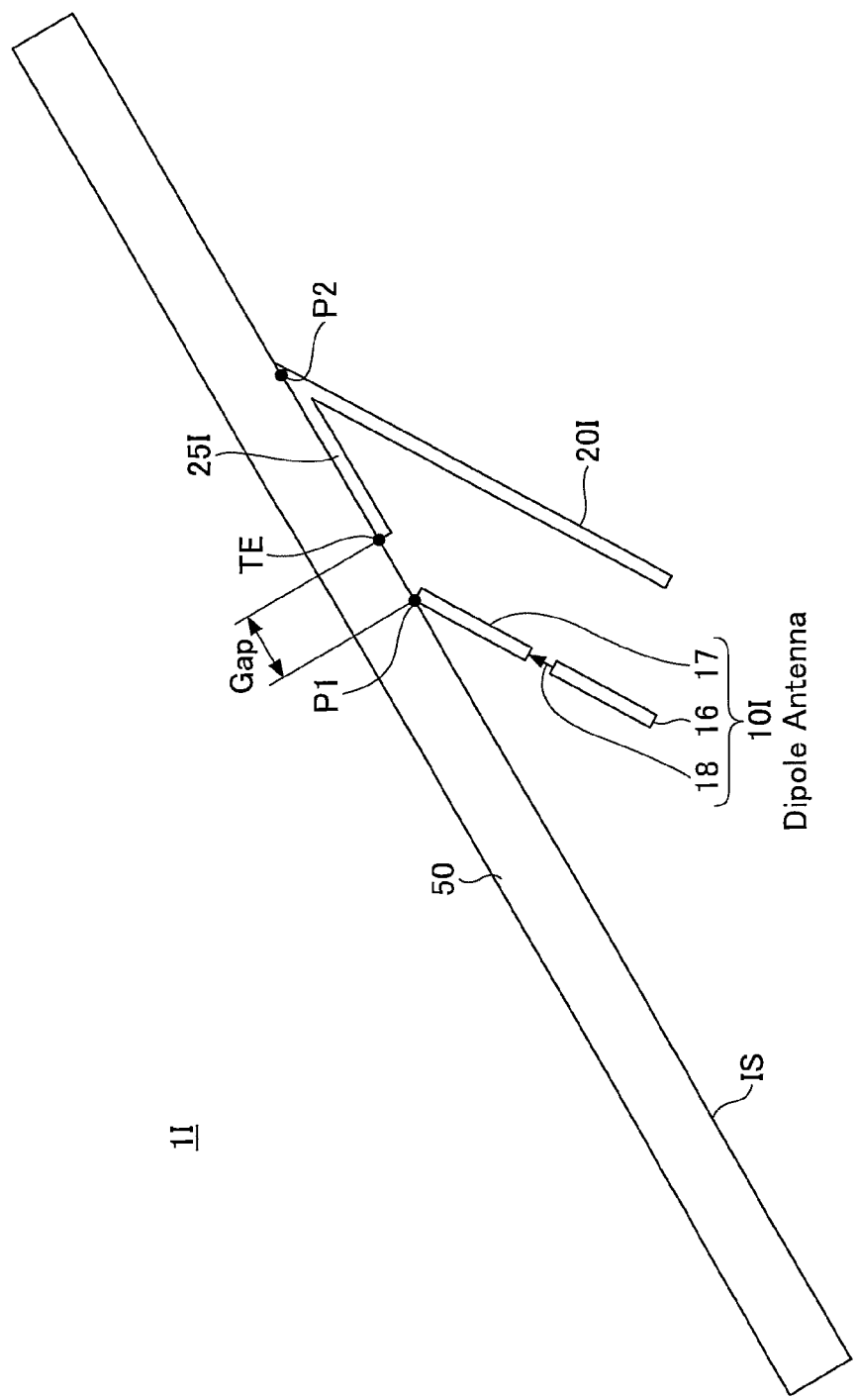
FIG. 17 is a side view depicting an antenna for vehicle according to a tenth embodiment of the present invention.

FIG. 17 illustrates a side view depicting an antenna for vehicle 1I according to a tenth embodiment of the present invention. In FIG. 17, a retention unit 30 is omitted from illustration.

In the first to ninth embodiments, the first radiator 10 has a lamination structure, as explained in detail in FIGS. 4, 5A and 5B. However, a first radiator 10I in the tenth embodiment may have a dipole structure.

The first radiator 10I having the dipole structure according to the embodiment includes two antenna elements 16, 17 arranged vertically, and is provided with a feeding point 18 in the central portion.

In the embodiment, the antenna elements 16, 17 included in the first radiator may be line-shaped elements such as circular cylinder poles or rectangular cylinder, or may be shapes of plate.

In the embodiment, a second radiator 20I and a third radiator 25I, according to the close arrangement, by the coupling with the dipole antenna included in the first radiator 10I, reradiates forward an electric field.

Also in the configuration, the third radiator 25I is assumed to be separated from the first radiator 10I. In this case, an interval (distance) gap between another end TE of the third radiator 25I and the upper end P1 of the first radiator 10I is preferably 0.025 λg or more. The interval will be described in detail in Example 4.

The third radiator 25 arranged in the seventh to tenth embodiments may be arranged additionally in the other embodiments such as illustrated in FIG. 6, 10, 11 or 12.

In this case, at least, as illustrated in the eighth embodiment, the third radiator 25 is assumed to be arranged within a quadrangular region R2 defined by the upper end P1 of the first radiator 10, the upper end P2 of the second radiator 20, the contact point P3 of the extension line E20 of the second radiator 20 in the vertical direction with the window glass for vehicle 50, and the contact point P4 of the extension line E10 of the first radiator in the vertical direction with the window glass for vehicle.

In either configuration, arrangement of the third radiator 25 has an effect of reradiating forward an electric field, preventing electric waves from leaking in the direction orthogonal to the window glass for vehicle 50, and thereby improving the antenna gain.

The communication information sent or received by the antenna for vehicle according to the present invention may be transferred to not only an ITS but also a reminder notification apparatus, a braking apparatus, or the like. Based on information obtained by communication with another vehicle around the own vehicle or the like, an operation of the own vehicle, in which the antenna for vehicle is installed, may be supported.

As described above, the antenna for vehicle has been described by the plurality of embodiments, but the present invention is not limited to the embodiments. Various variations and modifications, such as combination/replacement with/by a part or a whole of the other embodiment may be made without departing from the scope of the present invention.

EXAMPLE

In the antennas for vehicle 1, 1C illustrated in FIGS. 6 and 10, an average gain (Fr gain) in the forward direction within the range of 90° (range of ±45° based on 0° (front)) when a directivity of an azimuth angle direction is divided by four was measured when the distance D1 or the positional relationship (relative position Ld) was changed. The antenna for vehicle was attached to a glass plate of a laminated glass that represented the window glass for vehicle 50, and measurement was conducted.

Example 1

In the antenna for vehicle 1 according to the first embodiment, illustrated in FIG. 6, the gain was measured when the distance D1 between the rear surface of the first radiator 10 and the front surface S2 of the second radiator 20 was changed. In the measurement, the distance D1 was set to 3 mm, 5 mm or 10 mm. In this case, in the shape of the antenna for vehicle 1 upon measuring, dimensions of the respective elements were as follows (in units of mm):
L11 (L14): 25,
W11 (W14): 25,
L12: 18,
W12 (slot line width): 0.4,
L15: 19.33,
W15: 1.42,
T11: 0.053,
T14: 0.8,
T15: 0.053,
L20: 50,
W20: 50,
T20: 0.2,
glass plate: 300×300, and
glass thickness: 4.8.
The specific permittivity ε of the dielectric substrate 14 was 4.3.

In this case, the dimensions of the arrangement were fixed during the measurement as follows:
shortest distance between the glass plate and the first radiator D5: 10, and
distance from an edge part of the glass plate to a central portion of a slot of the first radiator Dp: 137.5.
Moreover, the inclination angles were set as follows:
inclination angle of the glass plate θ1: 20°
inclination angle of the first radiator θ2: 90°, and
inclination angle of the second radiator θ3: 90°.

TABLE 1 is a table indicating the antenna gain (Gain [dBi]), when the distance D1 between the rear surface of the first radiator 10 and the front surface S2 of the second radiator 20 of the antenna attached to the glass plate representing the antenna for vehicle 1, illustrated in FIG. 6, was changed. The results are compiled in FIG. 18. In this case, the measurement was conducted under the condition that the frequency was 5.89 GHz and the wavelength was 50.9 mm.

Figure 18:
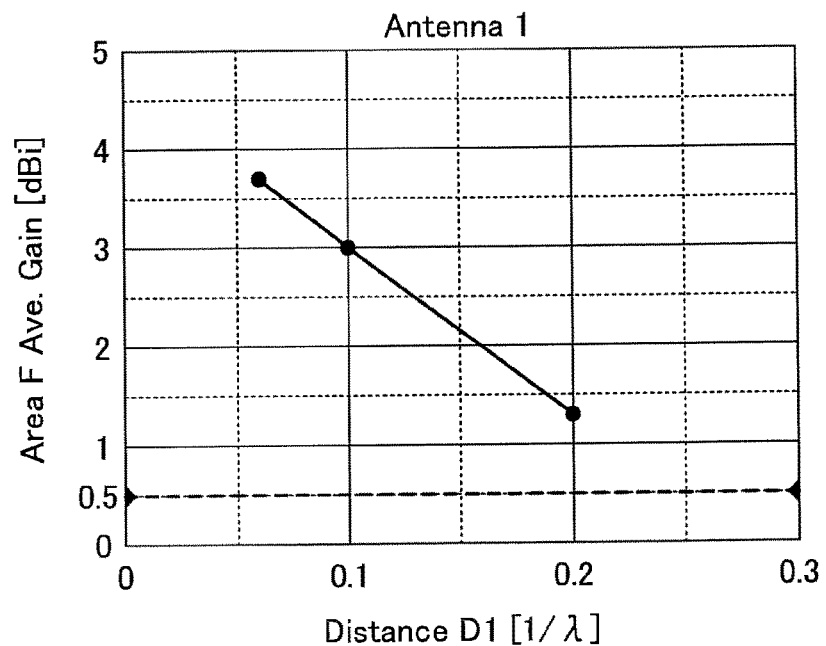
FIG. 18 is a graph depicting gain in the antenna for vehicle according to the first embodiment of the present invention, when a distance between the first radiator and the second radiator is changed.

A dotted line in FIG. 18 indicated the gain in the case where the second radiator 20 was not arranged. The horizontal axis in a graph of FIG. 18 is a value obtained by normalizing the distance D1 with a wavelength (value converted into a distance per a wavelength), and the vertical axis is gain in the forward direction (Area F) of the vertically polarized wave.

TABLE 1

| D1 [mm] | D1 (normalized) [1/λ] | Gain [dBi] |
|---|---|---|
| 3 | 0.06 | 3.7 |
| 5 | 0.10 | 3.0 |
| 10 | 0.20 | 1.3 |

As illustrated in TABLE 1 and FIG. 18, it is found that when the second radiator 20 moves away from the first radiator 10, the effect of reflecting electric waves to the forward direction by the second radiator 20 becomes smaller, and the operation gain of the first radiator 10 decreases. In Example 1, the measurement was conducted with the separation distance D1 up to 10 mm. It is found that at least under the condition that the distance D1 is 10 mm or less, the gain is improved by arranging the second radiator 20, compared with the case where the second radiator 20 is not arranged.

Example 2

In the antenna for vehicle 1C according to the fourth embodiment illustrated in FIG. 10, the gain was measured when the distance D1 between the first radiator 10C and the second radiator 20C was changed. In the measurement, the distance was set to 1 mm, 3 mm, 5 mm, 10 mm or 15 mm.

In this case, distances illustrated in the drawings were set to:

shortest distance between the glass plate and the first radiator D5: 1 mm, and distance from an edge part of the glass plate to a central portion of a slot of the first radiator Dp: 137.5 mm. Moreover, the inclination angles were set as follows:

inclination angle of the glass plate θ1: 20°
inclination angle of the first radiator θ2: 20°, and
inclination angle of the second radiator θ3: 20°. The other dimensions were the same as in Example 1.

TABLE 2 is a table indicating the antenna gain (Gain [dBi]), when the separation distance D1 between the first radiator 10C and the second radiator 20C of the antenna attached to a glass plate representing the antenna for vehicle 1C, illustrated in FIG. 10, was changed. The results are compiled in FIG. 19. A dotted line in FIG. 19 indicates the gain in the case where the second radiator was not arranged. What the horizontal axis and the vertical axis in a graph of FIG. 19 are the same as those in FIG. 18.

TABLE 2

| D1 [mm] | D1 (normalized) [1/λ] | Gain [dBi] |
|---|---|---|
| 1 | 0.02 | −4.0 |
| 2 | 0.04 | −4.6 |
| 3 | 0.06 | −7.3 |
| 5 | 0.10 | −10.0 |
| 10 | 0.20 | −14.8 |
| 15 | 0.29 | −15.0 |

Figure 19:
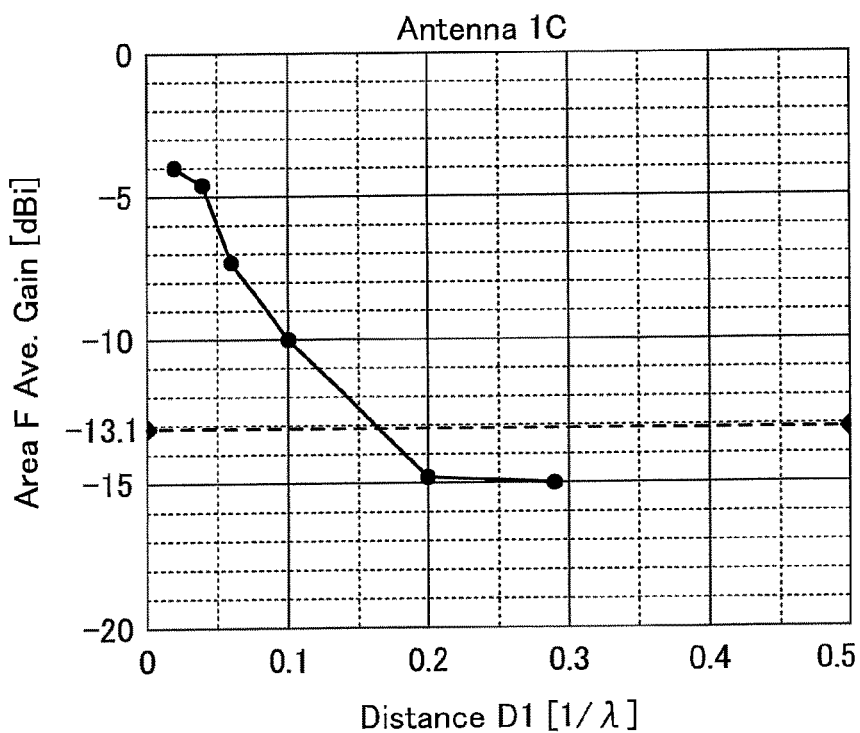
FIG. 19 is a graph depicting gain in the antenna for vehicle according to the fourth embodiment of the present invention, when a distance between the first radiator and the second radiator is changed.

As illustrated in TABLE 2 and FIG. 19, it is found that when the second radiator 20C moves away from the first radiator 10C, the effect of reflecting electric waves to the forward direction by the second radiator 20 becomes smaller, and the operation gain of the first radiator 10C decreases. In Example 2, the measurement was conducted with the separation distance D1 up to 15 mm. It is found that at least under the condition that the distance D1 is 5 mm or less, the gain is improved by arranging the second radiator 20C, compared with the case where the second radiator 20C is not arranged.

TABLE 3 illustrates presence or absence of an overlapping part, in the horizontal direction, of the second radiator 20C and the slot 12 in the positional relationship listed in TABLE 2.

TABLE 3

| distance between first radiator and second radiator D1 | comparison between second radiator and upper end O of first radiator in oblique side direction (Lx = 12.5 − (D1 + 0.8)/tan θ2) | projecting amount (retracting amount) of second radiator from upper end O of first radiator in vertical direction (Vx = Lx sin θ2) | distance of slot from upper end O of first radiator in oblique side direction | distance of slot from upper end O of first radiator in vertical direction | length of overlapping part β of slot and second radiator in vertical direction |
|---|---|---|---|---|---|
| 1 | +7.55 | +2.58 | upper end of slot Lt: −12.3 | upper end of slot Vt: −4.21 (Lt sin θ2) | 0.13 |
| 2 | +4.81 | +1.65 | lower end of slot Lb: −12.7 | lower end of slot Vb: −4.34 (Lb sin θ2) | 0.13 |
| 3 | +2.06 | +0.70 | | | 0.13 |
| 5 | −3.43 | −1.17 | | | 0.13 |
| 10 | −17.17 | −5.87 | | | 0 |
| 15 | −30.91 | −10.57 | | | 0 |

First, in Example 2, because centers of the first radiator 10C and the second radiator 20C are aligned in an oblique side direction (θ2 direction), viewed from the window glass 50 direction, always L11 (L14): 25 mm and L20: 50 mm, the second radiator 20C projects upwards in the oblique side direction (+Y direction) and downwards (−Y direction) by 50/2−25/2=12.5 mm for each.

By using the projection in the oblique side direction, a projection in the vertical direction with respect to the horizontal direction will be examined. A thickness T14 (=0.8 mm) of the dielectric substrate 14 that occupies most of the thickness of the first radiator 10C will be taken into account.

When the distance D1 between the rear surface of the first radiator 10C and the front surface S2 of the second radiator 20C is changed, the projecting amount (retracting amount)

Lx of the second radiator 20C from the upper end O of the first radiator 10C is expressed by the following formula. When the second radiator 20C projects from the upper end O, the value of Lx is positive (+). When the second radiator 20C retracts from the upper end O (the upper end O is above the second radiator), the value of Lx is negative (−).

$$Lx=12.5-(D1+0.8)/\tan θ2 \quad (1)$$

In Example 2, the angles illustrated in FIG. 10 were set to 20° (θ1=θ2=θ3=20°).

Based on the value Lx obtained as above, the projecting amount (retracting amount) Vx of the second radiator 20C from the upper end O of the first radiator 10C in the vertical direction can be calculated using the following formula.

$$Vx=Lx·\sin θ2 \quad (2)$$

As described above, the slot line width (W12) was 0.4 mm. When the slot 12 locates at the center of the conductive film 11, in the oblique side direction (−Y direction), the distance Lt on the surface (oblique side) from the upper end O of the first radiator 10C to the upper end of the slot 12 was 12.3 mm. The distance Lb on the surface (oblique side) from the upper end O to the lower end of the slot 12 was 12.7 mm.

In order to convert the above distances into distances in the vertical direction, each of the distances is required to be multiplied by sin θ2. In the same way as the formula (2), the distances in the vertical direction from the upper end O to the upper end and the lower end of the slot 12, Vt and Vb, are obtained as: Vt=−4.21 mm and Vb=−4.34 mm, based on the relations Vt=Lt·sin θ2 and Vb=Lb·sin θ2, and the angle θ2=20°.

When presence or absence of the overlapping part viewed from the horizontal direction is examined comparing the distance Vx from the upper end O in TABLE 3 with the converted slot position (Vt, Vb), it is found that the second radiator 20C overlaps with the slot 12, in the arrangements with the distances D1=1 mm, 2 mm, 3 mm and 5 mm. That is, the overlapping part β illustrated in FIG. 10 is present. In the arrangements with the distances D1=10 mm and 20 mm, it is found that the second radiator 20C does not overlap with the slot 12 in the horizontal direction.

Therefore, from the results of examination with TABLEs 2 and 3, and FIG. 19, the gain is improved by arranging the second radiator 20C, compared with the case where the second radiator 20C is not arranged. When the distance D1 is 5 mm or less, the second radiator 20C is arranged so as to overlap with the slot 12 in the horizontal direction. Therefore, as illustrated in Example 2, when the distance between the first radiator 10C and the second radiator 20C is changed while the central positions (relative position) are the same in the separation direction (so as to overlap with each other), the slot 12 and the second radiator 20C are preferably arranged proximally so that the slot 12 and the second radiator 20C overlap with each other in the horizontal direction.

Compared with the results of measurements in Example 1 and Example 2, the gain of the antenna for vehicle 1 illustrated in FIG. 6 is greater than that of the antenna for vehicle 1C illustrated in FIG. 10 as a whole. This is because in FIG. 6 the first radiator 10 and the second radiator 20 are arranged so that the surfaces of the first radiator 10 and the second radiator 20 on the window glass 50 side are vertical with respect to the propagation direction of the electromagnetic wave coming from a vehicle front side, but in FIG. 10 the first radiator 10C and the second radiator 20C are arranged so that the surfaces of the first radiator 10C and the second radiator 20C on the window glass 50 side slant with respect to the propagation direction.

Therefore, in order to ensure the desired gain, when the inclination angles of the first radiator 10C and the second radiator 20C are set to angles different from the vertical direction, as the antenna for vehicle 1C illustrated in FIG. 10, the first radiator 10C and the second radiator 20C are preferably arranged so that the first radiator 10C and the second radiator 20C are close to each other and at least a part of the second radiator 20C overlaps with the slot 12 in the horizontal direction.

Example 3

Figure 20:
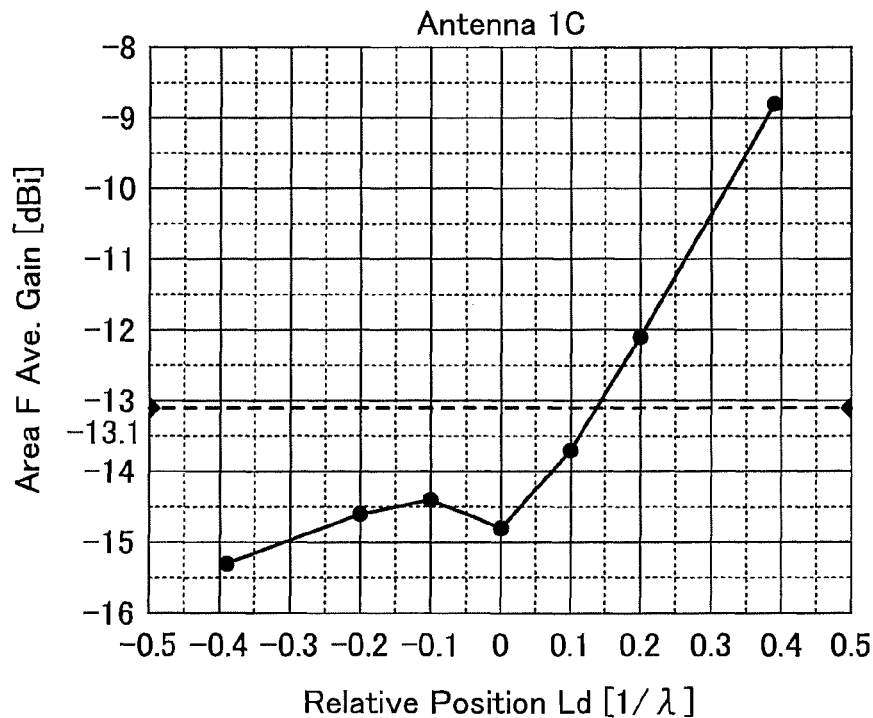
FIG. 20 is a graph depicting the gain in the antenna for vehicle according to the fourth embodiment of the present invention, when a relative position between the first radiator and the second radiator is changed.

FIG. 20 illustrates results of measurement for the gain when a relative position Ld between the first radiator 10C and the second radiator 20C is changed in the antenna for vehicle 1C according to the fourth embodiment of the present invention, illustrated in FIG. 10. The relative position Ld is defined as follows: Ld=0 mm at the position where the centers of the first radiator 10C and of the second radiator 20C overlaps with each other, the value of Ld is positive (+) when the second radiator 20C is moved in the direction to the upper right in FIG. 10, and the value of Ld is negative (−) when the second radiator 20C is move in the direction to the lower left. The value of Ld was set to −20 mm, −10 mm, −5 mm, 0 mm, 5 mm, 10 mm, or 20 mm.

TABLE 4 is a table indicating the antenna gain (Gain [dBi]), when the relative position Ld between the first radiator 10C and the second radiator 20C of the antenna attached to a glass plate representing the antenna for vehicle 1C, illustrated in FIG. 10, was changed. The results are compiled in FIG. 20. A dotted line in FIG. 20 indicates the gain in the case where the second radiator was not arranged. The gain was −13.1 dBi.

The horizontal axis in a graph of FIG. 20 is a value obtained by normalizing the relative position Ld with a wavelength (value converted into a distance per a wavelength). The dimensions of the respective elements were the same as in Example 2.

TABLE 4

| Ld [mm] | Ld (normalized) [1/λ] | Gain [dBi] |
|---|---|---|
| −20 | −0.39 | −15.3 |
| −10 | −0.20 | −14.6 |
| −5 | −0.10 | −14.4 |
| 0 | 0.00 | −14.8 |
| 5 | 0.10 | −13.7 |
| 10 | 0.20 | −12.1 |
| 20 | 0.39 | −8.8 |

As illustrated in TABLE 4 and FIG. 20, it is found that when the second radiator 20C moves to upper right in FIG. 10 with respect to the first radiator 10C, the gain in improved. It is found that, in this case, based on the result in Example 3, the greater the projecting part is, the greater the effect of the reflection is and the greater the effect of improving the antenna gain of the antenna for vehicle 1C is.

TABLE 5 illustrates presence or absence of an overlapping part, in the horizontal direction, of the second radiator 20C and the slot 12 in the positional relationship listed in TABLE 4.

TABLE 5

| moving distance from center Ld | comparison between second radiator and upper end O of first radiator in oblique side direction (Lx = 12.5 + (Ld) − 10.8/tan θ2) | projecting amount (retracting amount) of second radiator from upper end O of first radiator in vertical direction (Vx = Lx sin θ2) | distance of slot from upper end O of first radiator in oblique side direction | distance of slot from upper end O of first radiator in vertical direction | length of overlapping part β of slot and second radiator in vertical direction |
|---|---|---|---|---|---|
| −20 | −37.17 | −12.71 | upper end of slot Lt: −12.3 | upper end of slot Vt: −4.21 (Lt sin θ2) | 0 |
| −10 | −27.17 | −9.29 | lower end of slot Lb: −12.7 | lower end of slot Vb: −4.34 (Lb sin θ2) | 0 |
| −5 | −22.17 | −7.58 | | | 0 |
| 0 | −17.17 | −5.87 | | | 0 |
| 5 | −12.17 | −4.16 | | | 0 |
| 10 | −7.17 | −2.45 | | | 0.13 |
| 20 | +2.83 | +0.74 | | | 0.13 |

Also in Example 3, in the same way as in Example 2, when the distance Ld is zero, because centers of the first radiator 10C and the second radiator 20C are aligned in an oblique side direction (θ2 direction), the second radiator 20C projects upwards in the oblique side direction (+Y direction) and downwards (−Y direction) by 50/2−25/2=12.5 mm for each.

Moreover, in Example 3, the distance (separation distance) D1 between the first radiator 10C and the second radiator 20C is fixed to 10 mm. A thickness T14 (=0.8 mm) of the dielectric substrate 14 that occupies most of the thickness of the first radiator 10C will be taken into account. In this case, the distance between the surface S1 of the first radiator 10C on the window glass 50 side and the surface S2 of the second radiator 20C on the window glass 50 side is always 10.8 mm.

When the distance Ld (moving distance) between the center of the first radiator 10C and the center of the second radiator 20C is changed, the projecting amount (retracting amount) Lx of the second radiator 20C from the first radiator 10C in the oblique side direction is expressed by the following formula.

$$Lx = 12.5 + Ld - 10.8/\tan \theta 2 \quad (3)$$

In Example 3, the angles illustrated in FIG. 10 were set to 20° (θ1=θ2=θ3=20°).

Based on the value Lx obtained as above, the projecting amount (retracting amount) of the second radiator 20C form the upper end O of the first radiator 10C in the vertical direction can be calculated using the following formula.

$$Vx = Lx \cdot \sin \theta 2$$

The position of the slot, in the same way as in Example 2, the distance Lt on the surface (oblique side) from the upper end O to the upper end of the slot 12 in the oblique side direction (−Y direction) was 12.3 mm. The distance Lb on the surface (oblique side) from the upper end O to the lower end of the slot 12 was 12.7 mm. Moreover, the distances Vt and Vb in the vertical direction were −4.21 mm and −4.34 mm, respectively.

When presence or absence of the overlapping part viewed from the horizontal direction is examined comparing the distance Vx from the upper end O in TABLE 5 with the converted slot position (Vt, Vb), it is found that the second radiator 20C overlaps with the slot 12, in the arrangements with the distances Ld=10 mm and 20 mm. That is, the overlapping part β is present. In the arrangements with the distances Ld=−20 mm, −10 mm, 0 mm, and +5 mm, it is found that the second radiator 20C does not overlap with the slot 12 in the horizontal direction.

Therefore, from the results of examination with TABLEs 4 and 5, and FIG. 20, the gain is improved by arranging the second radiator 20C, compared with the case where the second radiator 20C is not arranged. When the distance Ld is 10 mm or more, the second radiator 20C is arranged so as to overlap with the slot 12 in the horizontal direction.

When the first radiator 10C and the second radiator 20C are arranged so as to be separated from each other by a predetermined distance, as in Example 3, the second radiator 20C is preferably arranged so as to overlap with the slot 12 in the horizontal direction, and so that in the Z-direction that is a direction orthogonal to the inclination direction θ2 (Y-direction) the center of the second radiator 20C is above the center of the first radiator 10C.

Moreover, with reference to TABLE 5, it is found for example that the more the second radiator 20C of Ld projects upward, the more the gain is. This is because it is possible to reflect forward the electric waves that the second radiator 20C receives directly from a front side without irradiating the first radiator 10C, and to collect the light into the first radiator 10C.

Therefore, in the embodiment of the present invention, when the first radiator 10C is projected onto the second radiator 20C in the horizontal direction for receiving electric waves coming from a front side, the second radiator 20C is preferably arranged so as to overlap with the slot 12 in the horizontal direction.

In Example 3, the example in which the second radiator 20C is arranged so that an upper part of the second radiator 20C projects above the first radiator 10C and below the first radiator 10C was illustrated. However, as long as the second radiator 20C is arranged so as to overlap with the slot 12 in the horizontal direction, the configuration in which the lower part of the second radiator 20C projects above or below the first radiator 10C may be possible. Moreover, also in the other embodiments, by arranging the second radiator 20C so that at least a part of the second radiator 20C overlaps with the slot 12 in the horizontal direction, the same effect can be provided.

Example 4

In the antennas for vehicle 1F, 1H, and 1I, illustrated in FIG. 13, FIG. 16, and FIG. 17, respectively, by changing the lengths L25, L25H, and L25I of the third radiators 25, 25H, and 25I, intervals gap between the other ends TE of the third radiators 25, 25H, and 25I and the upper ends P1 of the first radiators 10, 10H, and 10I were changed, and the gains were measured. In this case, in the shapes of the measured antennas for vehicle 1F, 1H and 1I, the dimensions of the respective elements were as follows (in unit of mm),

D25: 30,

T25: 0.2,

L16, L17: 10.865,

φ16, φ17 (diameters): 0.15, and

D18 (distance between elements configuring dipole): 1.14.

Other dimensions of the respective elements were the same as in Example 1.

Moreover, the angles of the respective elements were as follows,

θ1 (inclination angle of window glass for vehicle 50): 15°,

θ2 (inclination angle of first radiator 10F): 90°,

θ2 (inclination angles of first radiators 10H, 10I): 45°,

θ3 (inclination angle of second radiator 20F): 90°,

θ3 (inclination angles of second radiators 20H, 20I): 45°, and

θ4 (inclination angles of third radiators 25, 25H, 25I): 15°.

The interval gap indicates a distance along the surface IS of the window glass for vehicle 50 in the direction of the window glass between the upper end P1 of the first radiator 10 and the other end TE of the third radiator 25. Therefore, even if the intervals gap are the same according to the inclination angle θ2 of the first radiator 10 and the inclination angle θ3 of the second radiator 20, the distances between the first radiator 10 and the second radiator 20 (separation distance in the orthogonal direction) may be different.

TABLE 6 is a table indicating the antenna gain (Gain [dBi]), when the interval gap between (the upper end P1 of) the first radiator 10 and (the other end TE of) the third radiator 25 of the antenna attached to a glass plate representing the antenna for vehicle 1F, illustrated in FIG. 13, was changed. Similarly, TABLE 7 is a table indicating the antenna gain representing the antenna for vehicle 1H, and TABLE 8 is a table indicating the antenna gain representing the antenna for vehicle 1I.

Figure 21:
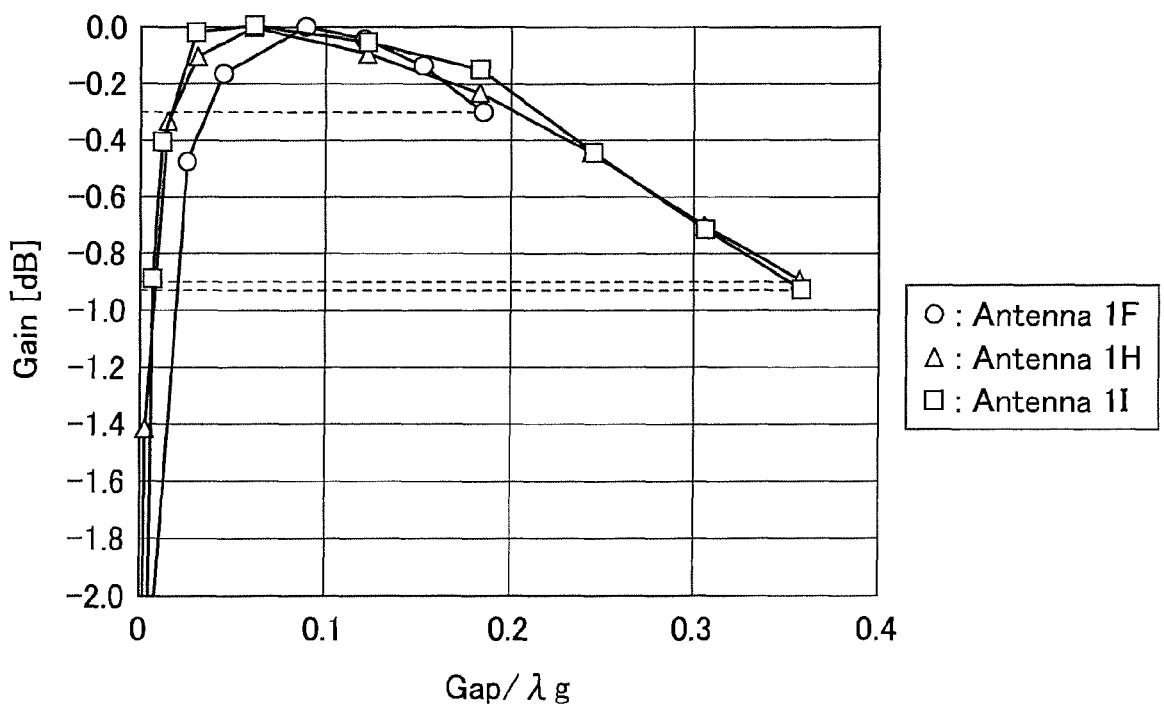
FIG. 21 is a graph depicting gains in the antennas for vehicle according to the seventh embodiment, the ninth embodiment, and the tenth embodiment, when a distance between the first radiator and the third radiator is changed.

Results listed in TABLEs 6 to 8 are compiled in FIG. 21. Particularly, FIG. 21 is a graph illustrating the gain in the antennas for vehicle 1F, 1H, and 1I according to the seventh embodiment, the ninth embodiment, and the tenth embodiment, when the intervals gap between the first radiators (10, 10H, 10I) and the third radiators (25, 25H, 25I) were changed.

The horizontal axis of FIG. 21 is a value obtained by normalizing the interval gap with a wavelength (value converted into a distance per a wavelength). The wavelength (λ) was assumed to be 50.93 mm, and the wavelength shortening coefficient of the window glass 50 (k) was assumed to be 0.64.

Dotted lines in FIG. 21 indicate the gains in the case where the third radiator was not arranged (L25, L25H, and L25I are zero). The gain according to the seventh embodiment was 7.06 dB (gain after normalization was −0.31 dBi). The gain according to the ninth embodiment was 4.70 dB (gain after normalization was −0.89 dBi). The gain according to the tenth embodiment was 2.97 dB (gain after normalization was −0.92 dBi).

TABLE 6

| L25 [mm] | gap | gap/λg | Ave. Gain | Normalized Gain |
|---|---|---|---|---|
| 6.04 | 0.00 | 0.000 | 3.37 | −3.99 |
| 5.94 | 0.10 | 0.003 | 4.82 | −2.55 |
| 5.21 | 0.83 | 0.025 | 6.87 | −0.49 |
| 4.55 | 1.49 | 0.046 | 7.20 | −0.17 |
| 3.10 | 2.94 | 0.090 | 7.37 | 0.00 |
| 2.07 | 3.97 | 0.122 | 7.32 | −0.04 |
| 1.03 | 5.01 | 0.154 | 7.23 | −0.14 |
| 0 (no third radiator) | 6.04 | 0.185 | 7.06 | −0.31 |

As illustrated in TABLE 6, in the seventh embodiment, the second radiator 20F was arranged parallel to the first radiator 10 that was arranged in an approximately vertical direction, and the separation distance (P1-P2 distance) between the upper end P1 of the first radiator 10 and the upper end P2 of the second radiator 20F was set to 6.01 mm. From the upper end P2 of the second radiator 20F, the third radiator 25 with a length L25 was extended gradually, toward lower left along the surface IS of the window glass 50 in FIG. 13, and the interval gap between the upper end P1 of the first radiator 10 and the other end TE (lower end) of the third radiator 25 was reduced.

Particularly, in FIG. 13, the P1-P2 distance in the window glass direction was set to 6.01 mm. The length L25 of the third radiator 25 along the surface IS of the window glass for vehicle 50 on the internal side was gradually increased, i.e. set to 0 mm (no third radiator), 1.03 mm, 2.07 mm, 3.10 mm, 4.55 mm, 5.21 mm, 5.94 mm, and 6.04 mm. Because the positions P1 and P2 were unchanged, as the length L25 of the third radiator 25 increased, the interval gap decreased, i.e. 6.04 mm, 5.01 mm, 3.97 mm, 2.94 mm, 1.49 mm, 0.83 mm, 0.10 mm, and 0 mm (no third radiator).

It is found that, as illustrated in TABLE 6 and FIG. 21, under the condition that the interval gap was 0.046 λg or more, the gain of the antenna 1F was improved by arranging the third radiator 25, compared with the case where the third radiator 25 is not arranged (L25=0).

TABLE 7

| L25H [mm] | gap | gap/λg | Ave. Gain | Normalized Gain |
|---|---|---|---|---|
| 11.67 | 0.00 | 0.000 | 2.07 | −3.52 |
| 11.57 | 0.10 | 0.003 | 4.17 | −1.42 |
| 11.17 | 0.50 | 0.015 | 5.24 | −0.35 |
| 10.67 | 1.00 | 0.031 | 5.49 | −0.11 |
| 9.67 | 2.00 | 0.061 | 5.59 | 0.00 |
| 7.67 | 4.00 | 0.123 | 5.50 | −0.09 |
| 5.67 | 6.00 | 0.184 | 5.36 | −0.24 |
| 3.67 | 8.00 | 0.245 | 5.15 | −0.44 |
| 1.67 | 10.00 | 0.307 | 4.89 | −0.70 |
| 0 (no third radiator) | 11.67 | 0.358 | 4.70 | −0.89 |

As illustrated in TABLE 7, in the ninth embodiment, the first radiator 10H and the second radiator 20H were arranged parallel to each other with the inclination angles θ2, θ3 of 45° to the horizontal direction. The P1-P2 distance in the window glass direction was set to 11.67 mm. From the upper end P2 of the second radiator 20H, the third radiator 25H with a length L25H was extended gradually, and the interval gap between the upper end P1 of the first radiator 10H and the other end TE (lower end) of the third radiator 25H was reduced.

Particularly, in FIG. 16, the P1-P2 distance in the window glass direction was set to 11.67 mm. The length L25H of the third radiator 25H along the surface IS of the window glass for vehicle 50 on the internal side was gradually increased, i.e. set to 0 mm (no third radiator), 1.67 mm, 3.67 mm, 5.67 mm, 7.67 mm, 9.67 mm, 10.67 mm, 11.17 mm, 11.57 mm, and 11.67 mm. Because the positions P1 and P2 were unchanged, as the length L25H of the third radiator 25H increased, the interval gap decreased, i.e. 11.67 mm, 10.00 mm, 8.00 mm, 6.00 mm, 4.00 mm, 2.00 mm, 1.00 mm, 0.50 mm, 0.10 mm, and 0 mm (no third radiator).

It is found that, as illustrated in TABLE 7 and FIG. 21, under the condition that the interval gap was 0.015 λg or more, the gain of the antenna 1H was improved by arranging the third radiator 25H, compared with the case where the third radiator 25H is not arranged.

TABLE 8

| L25I [mm] | gap | gap/λg | Ave. Gain | Normalized Gain |
|---|---|---|---|---|
| 11.67 | 0.00 | 0.000 | −5.09 | −8.98 |
| 11.47 | 0.20 | 0.006 | 3.00 | −0.89 |
| 11.27 | 0.40 | 0.012 | 3.47 | −0.42 |
| 10.67 | 1.00 | 0.031 | 3.86 | −0.03 |
| 9.67 | 2.00 | 0.061 | 3.89 | 0.00 |
| 7.67 | 4.00 | 0.123 | 3.83 | −0.06 |
| 5.67 | 6.00 | 0.184 | 3.74 | −0.15 |
| 3.67 | 8.00 | 0.245 | 3.44 | −0.45 |
| 1.67 | 10.00 | 0.307 | 3.17 | −0.72 |
| 0 (no third radiator) | 11.67 | 0.361 | 2.97 | −0.92 |

As illustrated in TABLE 8, in the tenth embodiment, the first radiator 10I and the second radiator 20I were arranged parallel to each other with the inclination angles θ2, θ3 of 45° to the horizontal direction. The P1-P2 distance in the window glass direction was set to 11.67 mm. From the upper end P2 of the second radiator 20I, the third radiator 25I with a length L25I was extended gradually, and the interval gap between the upper end P1 of the first radiator 10I and the other end TE (lower end) of the third radiator 25I was reduced.

Particularly, in FIG. 17, the P1-P2 distance in the window glass direction was set to 11.67 mm. The length L25I of the third radiator 25I along the surface IS of the window glass for vehicle 50 on the internal side was gradually increased, i.e. set to 0 mm (no third radiator), 1.67 mm, 3.67 mm, 5.67 mm, 7.67 mm, 9.67 mm, 10.67 mm, 11.27 mm, 11.47 mm, and 11.67 mm. Because the positions P1 and P2 were unchanged, as the length L25I of the third radiator 25I increased, the interval gap decreased, i.e. 11.67 mm, 10.00 mm, 8.00 mm, 6.00 mm, 4.00 mm, 2.00 mm, 1.00 mm, 0.40 mm, 0.20 mm, and 0 mm (no third radiator).

It is found that, as illustrated in TABLE 8 and FIG. 21, under the condition that the interval gap was 0.006 λg or more, the gain of the antenna 1H was improved by arranging the third radiator 25I, compared with the case where the third radiator 25I is not arranged.

Example 5

In the antenna for vehicle 1H according to the ninth embodiment, as illustrated in FIG. 16, the gain was measured when the positions of the upper end P1 of the first radiator 10H and the upper end P2 of the third radiator 25H were fixed and the inclination angle θ3 of the second radiator 20H was changed.

By changing the inclination angle θ3 of the second radiator 20H, a bending angle θ34 between the second radiator 20H and the third radiator 25H was changed. Furthermore, a relative inclination angle (θ34−θ12) of the second radiator 20H from the first radiator 10H was changed.

In Example 5, for reference, the measurement was performed for two configurations with the distances (distance between surfaces) D between the first radiator 10H and the second radiator 20H of 5 mm and 8 mm.

The separation distance D indicates a distance between the surface S1 of the first radiator and the surface S2 of the second radiator. In the first radiator 10, because the dielectric substrate 14 occupies most of the thickness, D were assumed to be (separation distance)D1+(thickness)T14, i.e. D≈D1+T14.

Dimensions were as follows.

In the case where D=5 mm,

L25H: 11.67 mm, and gap: 3 mm (corresponding to 0.092 λg).

In the case where D=8 mm,

L25H: 17.66 mm, and gap: 3 mm (corresponding to 0.092 λg).

Moreover, the inclination angles were set as follows.

θ1 (inclination angle of the window glass for vehicle 50): 15°,

θ2 (inclination angle of the first radiator 10H): 45°, and

θ4 (inclination angle of the third radiator 25H): 15°.

Then, other angles were given as follows, when the first radiator 10H and the second radiator 20H were parallel to each other.

θ12 (contained angle between the window glass for vehicle 50 and the first radiator 10H): 15°, θ34 (contained angle between the window glass for vehicle 50 and the second radiator 20H, which is the same as a bending angle between the second radiator 20H and the third radiator 25H): 15°, and the relative inclination angle θ34−θ12: 0°.

The angles in the configurations used in Examples 1 to 5 are compiled in FIG. 9.

TABLE 9

|  | θ1 | θ2 | θ3 | θ12 | θ34 |
|---|---|---|---|---|---|
| Example 1 antenna 1 | 20° | 90° | 90° | 70° | none |
| Example 2 antenna 1C | 20° | 20° | 20° | 0° | none |
| Example 3 antenna 1C | 20° | 20° | 20° | 0° | none |
| Example 4 antenna 1F | 15° | 90° | 90° | 75° | 75° |
| Example 4 antenna 1H | 15° | 45° | 45° | 30° | 30° |
| Example 4 antenna 1I | 15° | 45° | 45° | 30° | 30° |
| Example 5 antenna 1H (where θ2 − θ3 = +0°) | 15° | 45° | 45° | 30° | 30° |

The inclination angle θ3 of the second radiator 20H is changed using the set of angles: the inclination angle θ2 of the first radiator 10H is 45°, the bending angle θ34 between the second radiator 20H and the third radiator 25H is 15°, and the relative inclination angle (θ34−θ12) is 0°, as a reference. According to the variation of the inclination angle θ3, the bending angle θ34 between the second radiator 20H and the third radiator 25H is changed, and the relative inclination angle (θ34−θ12) of the second radiator 20H from the first radiator 10H is changed (See TABLEs 10 and 11, below).

Figure 22:
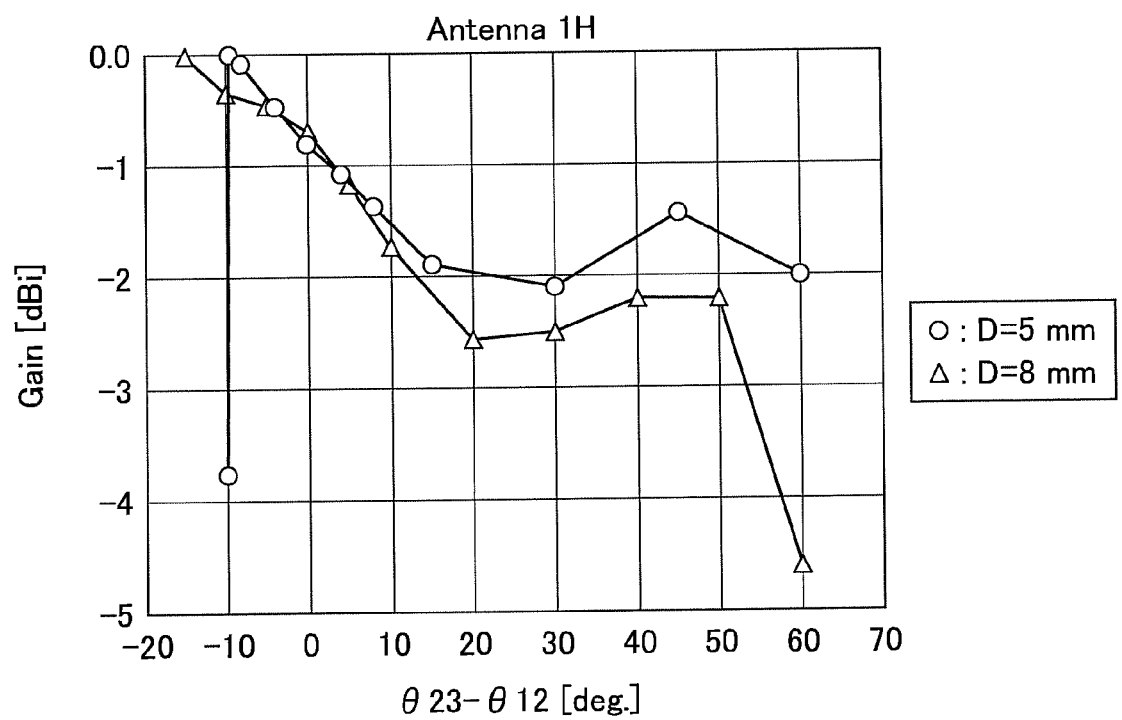
FIG. 22 is a graph depicting gain in the antenna for vehicle according to the ninth embodiment of the present invention, when an upper end of the second radiator is fixed, an inclination angle of the second radiator is changed, and thereby a relative inclination angle of the second radiator with respect to the first radiator varies.

The above results are compiled in FIG. 22. Particularly, FIG. 22 is a graph illustrating the gain in the antennas for vehicle 1H according to the ninth embodiment, when the relative inclination angle (θ34−θ12) of the second radiator 20H from the first radiator 10H was changed by fixing the upper end of the second radiator 20H and changing the inclination angle of the second radiator 20H.

TABLE 10

D = 5 mm

| θ1 (=θ4) | θ2 | θ3 | θ12 | θ34 | θ34−θ12 |
|---|---|---|---|---|---|
| 15° | 45° | 35° | 30° | 20° | −10° |
| 15° | 45° | 36° | 30° | 21° | −9° |
| 15° | 45° | 37° | 30° | 22° | −8° |
| 15° | 45° | 41° | 30° | 26° | −4° |
| 15° | 45° | 45° | 30° | 30° | ±0° |
| 15° | 45° | 49° | 30° | 34° | +4° |
| 15° | 45° | 53° | 30° | 38° | +8° |
| 15° | 45° | 60° | 30° | 45° | +15° |
| 15° | 45° | 75° | 30° | 60° | +30° |
| 15° | 45° | 90° | 30° | 75° | +45° |
| 15° | 45° | 105° | 30° | 90° | +60° |

In the case where the distance between surfaces D was 5 mm, as illustrated in TABLE 10, the relative inclination angle (θ34−θ12) was changed, i.e. set to −10°, −9°, −8°, 4°, ±0°, +4°, +8°, +15°, +30°, +45°, and +60°. In the case where the distance D is 5 mm, when the relative inclination angle θ34−θ12 was −10°, the lower end of the second radiator 20H was assumed to contact the lower end of the first radiator 10H.

TABLE 11

D = 8 mm

| θ1 (=θ4) | θ2 | θ3 | θ12 | θ34 | θ34−θ12 |
|---|---|---|---|---|---|
| 15° | 45° | 30° | 30° | 15° | −15° |
| 15° | 45° | 35° | 30° | 20° | −10° |
| 15° | 45° | 40° | 30° | 25° | −5° |
| 15° | 45° | 45° | 30° | 30° | ±0° |
| 15° | 45° | 50° | 30° | 35° | +5° |
| 15° | 45° | 55° | 30° | 40° | +10° |
| 15° | 45° | 65° | 30° | 50° | +20° |
| 15° | 45° | 75° | 30° | 60° | +30° |
| 15° | 45° | 85° | 30° | 70° | +40° |
| 15° | 45° | 95° | 30° | 80° | +50° |
| 15° | 45° | 105° | 30° | 90° | +60° |

In the case where the distance between surfaces D was 8 mm, as illustrated in TABLE 11, the relative inclination angle (θ34−θ12) was changed, i.e. set to −15°, −10°, −5°, ±0°, +5°, +10°, +20°, +30°, +40°, +50°, and +60°. In the case where the distance D is 8 mm, even when the relative inclination angle θ34−θ12 was −15°, the lower end of the second radiator 20H was assumed not to contact the lower end of the first radiator 10H.

As illustrated in FIG. 22, it is found that, in either case of the configurations of D=5 mm and D=8 mm, the closer the lower end of the second radiator 10H is to the lower end of the first radiator 20H, the more the gain is improved.

In either case of the configurations of D=5 mm and D=8 mm, when the relative inclination angle (θ34−θ12) is +45°, the surface S2 of the second radiator 20H is approximately vertical. Around the position where the surface S2 is vertical, the gain is improved. However, as the lower end of the second radiator 20H gets further away from the lower end of the first radiator 10H, the gain rapidly decreases.

Therefore, from FIG. 22, it is found that in the antenna for vehicle 1H illustrated in FIG. 16, the second radiator 20H is preferably arranged so that the distance between the lower end of the first radiator 10H and the lower end of the second radiator 20H is less than the distance between the upper end P1 of the first radiator 10H and the upper end P2 of the second radiator 20H.

The present invention provides an antenna for vehicle having a simple structure, being capable of transmitting/receiving electric waves from a front side of a vehicle to be communicating, and being attached to a window glass for vehicle. The antenna for vehicle can be suitably applied to, for example, vehicle-to-vehicle communication or road-to-vehicle communication.

Further, the present invention is not limited to these examples, but various variations and modifications may be made without deviating from the scope of the present invention.

What is claimed is:

1. An antenna for a vehicle configured to be attached to an internal side of a window glass for a vehicle, for receiving electric waves from a vehicle front side, the antenna comprising:
    a retention unit comprising a bonding part configured to bond the antenna to a surface of the internal side of the window glass, the bonding part defining a plane parallel to the surface of the internal side of the window glass when attached to the internal side of the window glass;
    a first radiator having a shape of a plate, at least a part of the first radiator being arranged separated from the plane, wherein the first radiator includes a plate having a three-layers structure including:
        a dielectric substrate having a shape of a plate,
        a feeding element arranged on one main surface of the dielectric substrate, and
        a radiating element arranged on another main surface of the dielectric substrate; and
    a second radiator arranged separated from the first radiator, and arranged so as to sandwich at least a part of the first radiator between the second radiator and the plane,
    wherein the retention unit retains the first radiator and the second radiator, and
    an angle formed by the plane and a surface of the first radiator on a side facing the plane is an acute angle,
    wherein in the first radiator, the feeding element is arranged on a second radiator side of the dielectric substrate,
    wherein the radiating element is arranged on a window glass side of the dielectric substrate,
    wherein the feeding element is a conductive film forming a micro strip line,
    wherein the radiating element is a conductive film from which a slot extending in a first direction is cut out,
    wherein positions of the micro strip line and the slot are determined so that when the micro strip line is projected onto the conductive film from which the slot is cut out, a part of the micro strip line overlaps with a part of the slot,
    wherein the antenna for the vehicle is attached to the window glass for the vehicle so that the first direction, in which the slot extends, is a horizontal direction, and
    wherein the second radiator is arranged so as to overlap with the slot in the horizontal direction.

2. The antenna for the vehicle according to claim 1, wherein the angle formed by the plane and the surface of the first radiator is greater than 0° but less than or equal to an angle at which the first radiator is arranged in a vertical direction.

3. The antenna for the vehicle according to claim 1, wherein an angle formed by a surface of the second radiator on a window glass side and a surface of the window glass for the vehicle on the internal side is an acute angle, and the angle is greater than 0° but less than or equal to an angle at which the first radiator is arranged in a vertical direction.

4. The antenna for the vehicle according to claim 1, wherein the surface of the internal side of the window glass, a surface of the first radiator on a window glass side, and a surface of the second radiator on a window glass side are inclined with angles that are different from one another.

5. The antenna for the vehicle according to claim 4, wherein the surface of the first radiator on the window glass side and the surface of the second radiator on the window glass side are inclined so that a lower end of the surface of the first radiator on the window glass side approaches a lower end of the surface of the second radiator on the window glass side.

6. The antenna for the vehicle according to claim 1, wherein the surface of the internal side of the window glass, a surface of the first radiator on a window glass side, and a surface of the second radiator on a window glass side are inclined so as to be parallel to one another.

7. The antenna for the vehicle according to claim 1 further comprising:
    a third radiator arranged within a quadrangular region defined by an upper end of the first radiator, an upper end of the second radiator, a contact point of an extension line of the second radiator in the vertical direction with the window glass for the vehicle, and a contact point of an extension line of the first radiator in the vertical direction with the window glass for the vehicle.

8. The antenna for the vehicle according to claim 7, wherein the second radiator and the third radiator have shapes of plates,
    wherein an end of the third radiator is connected to the upper end of the second radiator, and the third radiator is integrated with the second radiator, and
    wherein a surface of the third radiator extends in a direction different from a direction of the surface of the second radiator, so that the other end of the third radiator approaches the upper end of the first radiator or the contact point of the extension line of the second radiator in the vertical direction with the window glass for the vehicle.

9. The antenna for the vehicle according to claim 7, wherein the third radiator does not contact the first radiator, and
    wherein parts of the third radiator and the first radiator, which come closest to each other, are separated from each other by 0.015 λg or more, λg being a wavelength of the electric waves in the window glass for the vehicle.

10. The antenna for the vehicle according to claim 7, wherein at least a part of the third radiator contacts the window glass for the vehicle.

11. The antenna for the vehicle according to claim 1,
wherein the micro strip line includes a line part extending in a second direction that is different from the horizontal direction, and
wherein the line part reaches an upper edge of the dielectric substrate in a state where the antenna for the vehicle is attached to the window glass for the vehicle.

12. The antenna for the vehicle according to claim 1,
wherein the micro strip line includes a first line part extending in a second direction that is different from the horizontal direction, and a second line part bent from an upper edge of the dielectric substrate and extending in a third direction that is different from the second direction, and
wherein the second line part reaches a side edge of the dielectric substrate in a state where the antenna for the vehicle is attached to the window glass for the vehicle.

13. The antenna for the vehicle according to claim 11,
wherein in the first radiator, the radiating elements and the upper edge or the side edge of the dielectric substrate which the micro strip line reaches are electrically connected to a coaxial cable.

14. The antenna for the vehicle according to claim 1,
wherein the first radiator has a dipole structure including two elements.

15. The antenna for the vehicle according to claim 1,
wherein the retention unit includes a frame body surrounding at least a part of the first radiator and the second radiator, and
wherein a lens for adjustment is arranged on at least a part of a surface located on a lower side of a slope of the window glass for the vehicle of the frame body.

16. An antenna for a vehicle configured to be attached to an internal side of a window glass for a vehicle, for receiving electric waves from a vehicle front side, the antenna comprising:
a first radiator having a shape of a plate, at least a part of the first radiator being arranged separated from the window glass for the vehicle; and
a second radiator arranged separated from the first radiator, and arranged so as to sandwich at least a part of the first radiator between the second radiator and the window glass for the vehicle, wherein:
the first radiator includes a plate having a three-layers structure including:
a dielectric substrate having a shape of a plate;
a feeding element arranged on one main surface of the dielectric substrate; and
a radiating element arranged on another main surface of the dielectric substrate,
in the first radiator, the feeding element is arranged on a second radiator side of the dielectric substrate,
the radiating element is arranged on a window glass side of the dielectric substrate,
the feeding element is a conductive film forming a micro strip line,
the radiating element is a conductive film from which a slot extending in a first direction is cut out,
positions of the micro strip line and the slot are determined so that when the micro strip line is projected onto the conductive film from which the slot is cut out, a part of the micro strip line overlaps with a part of the slot,
the antenna for the vehicle is attached to the window glass for the vehicle so that the first direction, in which the slot extends, is a horizontal direction,
the micro strip line includes a first line part extending in a second direction that is different from the horizontal direction, and a second line part bent from an upper edge of the dielectric substrate and extending in a third direction that is different from the second direction, and
the second line part reaches a side edge of the dielectric substrate in a state where the antenna for the vehicle is attached to the window glass for the vehicle.

* * * * *